United States Patent
Agiwal et al.

(10) Patent No.: US 11,064,534 B2
(45) Date of Patent: Jul. 13, 2021

(54) METHOD AND APPARATUS FOR SUPPORTING MULTIPLE MESSAGE A SIZES AND UPLINK COVERAGE FOR TWO STEP RANDOM ACCESS PROCEDURE

(71) Applicant: Samsung Electronics Co., Ltd., Suwon-si (KR)

(72) Inventors: Anil Agiwal, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/578,916

(22) Filed: Sep. 23, 2019

(65) Prior Publication Data

US 2020/0100297 A1    Mar. 26, 2020

Related U.S. Application Data

(60) Provisional application No. 62/734,540, filed on Sep. 21, 2018.

(51) Int. Cl.
*H04W 74/08* (2009.01)
*H04W 74/00* (2009.01)
(Continued)

(52) U.S. Cl.
CPC ...... *H04W 74/0833* (2013.01); *H04B 17/318* (2015.01); *H04L 5/0048* (2013.01);
(Continued)

(58) Field of Classification Search
CPC .......... H04W 74/0833; H04W 36/0085; H04B 7/088; H04B 17/318
(Continued)

(56) References Cited

U.S. PATENT DOCUMENTS

2010/0085926 A1*  4/2010  Harada ............... H04W 28/065
                                                              370/329
2010/0232363 A1*  9/2010  Hsu ..................... H04L 1/0091
                                                              370/328
(Continued)

FOREIGN PATENT DOCUMENTS

KR    10-2018-0081372 A    7/2018
WO       2018/066934 A2    4/2018

OTHER PUBLICATIONS

LG Electronics, 'Enhanced 4-step RACH procedure for NR-U', R2-1812835, 3GPP TSG-RAN WG2 #103, Gothenburg, Sweden, Aug. 10, 2018 See section 2., Aug. 10, 2018.
(Continued)

*Primary Examiner* — Asad M Nawaz
*Assistant Examiner* — Jason A Harley
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method by a terminal configured with at least one serving cell for performing a random access (RA) procedure is provided. The method includes measuring downlink reference signal received power (DL RSRP) of a serving cell on which the RA procedure is initiated, determining whether the DL RSRP of the serving cell is greater than a threshold, and performing a two-step RA procedure based on the DL RSRP of the serving cell being greater than the threshold.

18 Claims, 20 Drawing Sheets

(51) Int. Cl.
*H04W 36/30* (2009.01)
*H04L 5/00* (2006.01)
*H04J 3/06* (2006.01)
*H04W 36/36* (2009.01)
*H04W 24/08* (2009.01)
*H04B 17/318* (2015.01)
*H04W 72/08* (2009.01)
*H04W 4/70* (2018.01)

(52) U.S. Cl.
CPC .............. *H04W 24/08* (2013.01); *H04W 4/70* (2018.02); *H04W 72/085* (2013.01)

(58) Field of Classification Search
USPC .................................. 370/329, 437; 455/436
See application file for complete search history.

(56) References Cited

U.S. PATENT DOCUMENTS

| | | | |
|---|---|---|---|
| 2012/0184206 A1* | 7/2012 | Kim | H04L 5/0091 455/9 |
| 2014/0286240 A1* | 9/2014 | Kim | H04W 76/28 370/328 |
| 2018/0035466 A1* | 2/2018 | Rune | H04W 74/08 |
| 2018/0110074 A1* | 4/2018 | Akkarakaran | H04W 72/0413 |
| 2018/0124724 A1* | 5/2018 | Tsai | H04W 74/0833 |
| 2018/0124824 A1* | 5/2018 | Lee | H04W 48/16 |
| 2019/0207662 A1* | 7/2019 | Zhou | H04W 72/042 |
| 2020/0245205 A1* | 7/2020 | Park | H04W 36/30 |

OTHER PUBLICATIONS

OPPO, 'Two-steps RACH procedure for NR-U', R2-1811067, 3GPP TSG-RAN WG2 Meeting #103, Gothenberg, Sweden, See sections 2-3, Aug. 10, 2018.

Intel Corporation, 'Considerations of 2-step CBRA for NR licensed and unlicensed operation', R2-1811664, 3GPP TSG-RAN WG2 Meeting #103, Gothenberg, Sweden, See sections 1-3, Aug. 10, 2018.

International Search Report dated Jan. 3, 2020, issued in International Patent Application No. PCT/KR2019/012360.

* cited by examiner

METHOD AND APPARATUS FOR SUPPORTING MULTIPLE MESSAGE A SIZES AND UPLINK COVERAGE FOR TWO STEP RANDOM ACCESS PROCEDURE

CROSS-REFERENCE TO RELATED APPLICATION(S)

This application is based on and claims priority under 35 U.S.C. § 119(e) of a U.S. Provisional application Ser. No. 62/734,540, filed on Sep. 21, 2018, in the U.S. Patent and Trademark Office, the disclosure of which is incorporated by reference herein in its entirety.

BACKGROUND

1. Field

The disclosure relates to a system and a method for supporting multiple message A (MsgA) sizes and uplink (UL) coverage for 2 step random access procedure.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands, but also in higher frequency millimeter Wave (mmWave) bands, e.g., 10 gigahertz (GHz) to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In recent years several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports not only the voice service, but also data service. The 4G wireless communication system has been developed to provide high-speed data service. However, the 4G wireless communication system currently suffers from lack of resources to meet the growing demand for high-speed data services. Therefore, the 5G wireless communication system is being developed to meet the growing demand of various services with diverse requirements, e.g., high-speed data services, support ultra-reliability and low latency applications.

In addition, the 5G wireless communication system is expected to address different use cases having quite different requirements in terms of data rate, latency, reliability, mobility etc. However, it is expected that the design of the air-interface of the 5G wireless communication system would be flexible enough to serve user equipment (UEs) having quite different capabilities depending on the use case and market segment in which the UE caters service to the end customer. Example use cases the 5G wireless communication system is expected to address includes enhanced mobile broadband (eMBB), massive Machine Type Communication (m-MTC), ultra-reliable low latency communication (URLL), etc. The eMBB requirements like tens of gigabits per second (Gbps) data rate, low latency, high mobility so on, address the market segment representing the wireless broadband subscribers of the related art needing internet connectivity everywhere, all the time and on the go. The m-MTC requirements like very high connection density, infrequent data transmission, very long battery life, low mobility address so on, address the market segment representing the IoT/IoE envisioning connectivity of billions of devices. The URLL requirements like very low latency, very high reliability and variable mobility so on and so forth address the market segment representing the Industrial automation application, vehicle-to-vehicle/vehicle-to-infrastructure communication that is foreseen as one of the enablers for autonomous cars.

In the 5G (also referred as NR or New Radio) wireless communication system, random access (RA) procedure is used to achieve uplink (UL) time synchronization. RA procedure is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. During the RA procedure (which comprise of 4 steps), the UE first transmits RA preamble (also referred as message 1 (Msg1)) and then waits for RA response (RAR) or message 2 (Msg2) in the RAR window corresponding to its random access preamble transmission. Next generation node B (gNB) transmits the RAR on physical downlink shared channel (PDSCH) addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by the gNB. The maximum size of RAR window is one radio frame, i.e. 10 ms. The RA-RNTI is calculated as follows: RA-RNTI=1+s_id+14*t_id+14*80*f_id+ 14*80*8*ul_carrier_id, where:

s_id is the index of the first orthogonal frequency division multiplexing (OFDM) symbol of the PRACH occasion where UE has transmitted Msg1, i.e. RA preamble; 0≤s_id<14, t_id is the index of the first slot of the PRACH occasion (0≤t_id<80), f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

Several RARs for various RA preambles detected by the gNB can be multiplexed in the same RAR media access control (MAC) protocol data unit (PDU) by the gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by the gNB in the RACH configuration) number of times, the UE retransmits the RA preamble.

If the RAR corresponding to its RA preamble transmission is received and UE has transmitted a dedicated RA preamble, RA procedure is considered successful. If the UE has transmitted a non-dedicated (i.e. contention based) RA preamble then upon successful reception of RAR, the UE transmits message 3 (Msg3) in UL grant received in RAR. Msg3 includes message such as RRC connection request, RRC connection re-establishment request, RRC handover confirm, scheduling request, system information (SI) request, etc. It also includes the UE identity (i.e. cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, the UE retransmits the RA preamble.

In the 5G wireless communication system, 2 step contention-free RA (CFRA) procedure is also supported. CFRA procedure is used for scenarios such as handover where low latency is required, timing advance establishment for secondary cell (Scell), etc. Evolved node B (eNB) assigns to UE non-contention RA preamble in dedicated signaling. The UE transmits the assigned non-contention RA preamble. The ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA procedure terminates after receiving the RAR.

In order to reduce the latency of 4 step CBRA procedure, a 2 step CBRA procedure is being studied. In the first step of the 2 step CBRA procedure, a UE transmits RA preamble on PRACH and a payload on physical uplink shared channel (PUSCH). The RA preamble and payload transmission is also referred as message A (MsgA). In the second step, after MsgA transmission, the UE monitors for a response from the network within a configured window. The response is also referred as message B (MsgB). The UE performs contention resolution using the contention resolution information in MsgB. If contention resolution is successful, RA procedure is considered successfully completed. Instead of contention resolution information corresponding to the transmitted MsgA, the MsgB may include fallback indication corresponding to the RA preamble transmitted in the MsgA. If the fallback indication is received, the UE transmits Msg3 and performs contention resolution using message 4 (Msg4) as in 4 step CBRA procedure. If contention resolution is successful, RA procedure is considered successfully completed. If contention resolution fails upon fallback (i.e. upon transmitting Msg3), the UE retransmits MsgA. If configured window in which the UE monitors network response after transmitting MsgA expires and the UE has not received MsgB including contention resolution information or fallback indication as described above, the UE retransmits MsgA. If the RA procedure is not successfully completed even after transmitting MsgA configurable number of times, the UE fallbacks to 4 step RACH procedure, i.e. the UE only transmits a PRACH preamble.

In the 2 step RA procedure, one or more types of information such as RRC message, buffer status report, power head room report, UL data, the UE IDs, etc. can be included in a MsgA payload depending on the UE's RRC state (i.e. idle, inactive or connected) or events (such as scheduling request, PDCCH order, beam failure recovery, etc.) that triggered the RA procedure. As a result, the size of MsgA payload can be variable. A resource pool comprising of a set of PUSCH resources (time/frequency resources) is configured, where a MsgA payload can be transmitted by selecting a PUSCH resource (also referred as PUSCH occasion) from resource pool. In order to support the variable size of MsgA payload, PUSCH resource needs to be configured large enough to accommodate the maximum size of MsgA payload. This will, however, lead to wastage of resources for smaller size of MsgA payload. So a method is needed to support variable size of MsgA payload efficiently.

Similar to 2 step CBRA, in 2 step CFRA procedure also payload can be transmitted in MsgA in addition to preamble.

RA preamble and/or PUSCH resource is dedicatedly assigned to UE for 2 step CFRA procedure.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

In the 2 step random access (RA) procedure, one or more types of information such as radio resource control (RRC) message, buffer status report, power head room report, uplink (UL) data, user equipment (UE) identifiers (IDs), etc. can be included in a message A (MsgA) payload depending on the UE's RRC state (i.e. idle, inactive or connected) or events (such as scheduling request, physical downlink control channel (PDCCH) order, beam failure recovery, etc.) that triggered the RA procedure. As a result, the size of MsgA payload can be variable. A resource pool comprising of a set of physical uplink shared channel (PUSCH) resources (time/frequency resources) is configured, where a MsgA payload can be transmitted by selecting a PUSCH resource (also referred as PUSCH occasion) from resource pool. In order to support the variable size of MsgA payload, PUSCH resource needs to be configured large enough to accommodate the maximum size of MsgA payload. This will, however, lead to wastage of resources for smaller size of MsgA payload. So a method is needed to support variable size of MsgA payload efficiently.

Unlike the 4 step RACH procedure, MsgA of 2 step RA procedure includes information bits. In the 4 step RACH procedure, these information bits are transmitted using message 3 (Msg3) wherein hybrid automatic repeat request (HARQ) or transmission time interval (TTI) bundling is used for Msg3 transmission. HARQ or TTI bundling ensures that Msg3 can be reliably transmitted by UEs near and far away (i.e. at cell edge) from next generation node B (gNB). In case of MsgA, mechanism is needed so that MsgA can be reliably transmitted by UEs near and far away from gNB.

There can be ambiguity in determining whether network response transmitted by gNB is for 2 step or 4 step RA. For example, UE1 transmits Msg1 for 4 step RA. UE2 transmits MsgA for 2 step RA. For network response, UE monitors PDCCH addressed to RA-radio network temporary identifier (RA-RNTI) where RA-RNTI is determined as follows: RA-RNTI=1+s_id+14*t_id+14*80*f_id+14*80*8*ul_carrier_id. s_id, t_id, f_id and ul_carrier_id corresponding to a MsgA occasion for 2 step RA and a Msg1 occasion for 4 step RA can be same. So a method is needed to avoid this ambiguity.

In accordance with an aspect of the disclosure, a method by a terminal configured with at least one serving cell for performing a random access (RA) procedure is provided. The method includes measuring downlink reference signal received power (DL RSRP) of a serving cell on which the RA procedure is initiated, determining whether the DL RSRP of the serving cell is greater than a threshold, and performing a two-step RA procedure based on the DL RSRP of the serving cell being greater than the threshold.

In accordance with another aspect of the disclosure, a terminal configured with at least one serving cell in a wireless communication system is provided. The terminal includes a transceiver and a processor coupled with the transceiver. The processor is configured to measure downlink reference signal received power of a serving cell on which the RA procedure is initiated, determine whether the DL RSRP of the serving cell is greater than a threshold, and perform a two-step random access (RA) procedure based on the DL RSRP of the serving cell being greater than the threshold.

Based on the features of this disclosure, variable size of MsgA payload can be efficiently supported. MsgA can also be reliably transmitted by UEs near and far away from gNB. The features of this disclosure also remove ambiguity in determining whether network response transmitted by gNB is for 2 step or 4 step RA.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
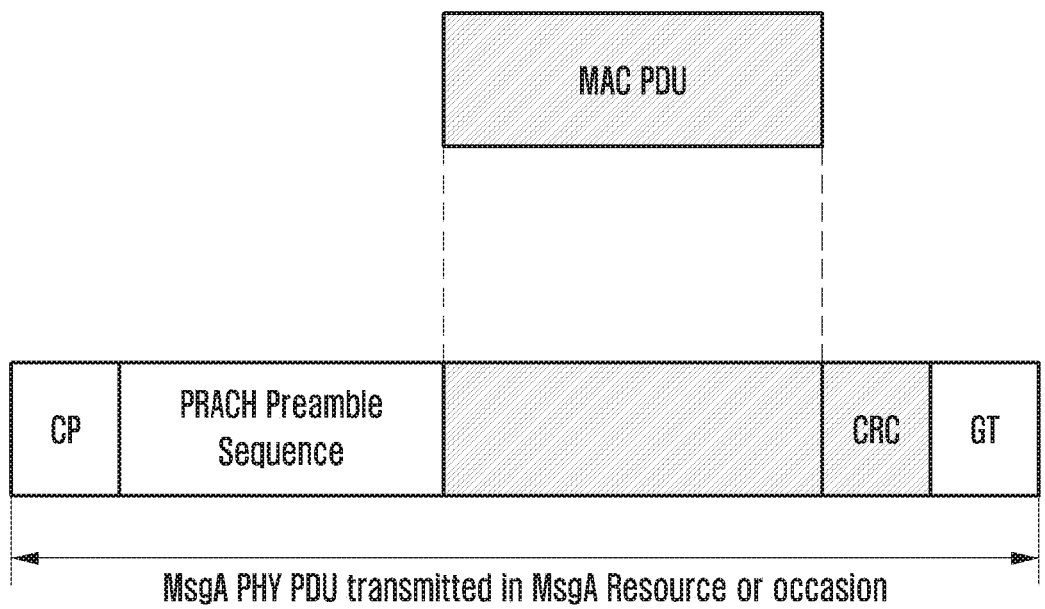
FIG. 1 illustrates a message A (MsgA) physical (PHY) protocol data unit (PDU) that is transmitted in a MsgA occasion (or MsgA resource) for a 2 step random access (RA) according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A "base station (BS)" is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A "UE" is an entity communicating with a BS and may be referred to as a UE, a device, a mobile station (MS), a mobile equipment (ME), or a terminal.

In the disclosure, the 2 step random access (RA) procedure comprising of message A (MsgA) and message B (MsgB) refers to following procedure: In the first step of the 2 step contention based RA (CBRA) procedure, a UE transmits RA preamble on physical RA channel (PRACH) and a payload on physical uplink shared channel (PUSCH). The RA preamble and payload transmission is also referred as MsgA. In the second step, after MsgA transmission, the UE monitors for a response from the network within a configured window. The response is also referred as MsgB. The UE performs contention resolution using the contention resolution information in MsgB. If contention resolution is successful, RA procedure is considered successfully completed. Instead of contention resolution information corresponding to the transmitted MsgA, the MsgB may include a fallback indication corresponding to the RA preamble transmitted in the MsgA. If the fallback indication is received, the UE transmits Msg3 and performs contention resolution using message 4 (Msg4) as in 4 step CBRA procedure. If contention resolution is successful, RA procedure is considered successfully completed. If contention resolution fails upon fallback, the UE retransmits MsgA. If configured window in which the UE monitor network response after transmitting MsgA expires and the UE has not received MsgB including contention resolution information or fallback indication as described above, the UE retransmits MsgA. If the RA procedure is not successfully completed even after transmitting the MsgA configurable number of times, the UE fallbacks to 4 step random access channel (RACH) procedure, i.e. the UE only transmits the PRACH preamble. In the 2 step RA procedure, one or more types of information such as radio resource control (RRC) message, buffer status report, power head room report, uplink (UL) data, UE identifier (ID) (e.g. cell-radio network temporary identifier (C-RNTI), system architecture evolution (SAE)-temporary mobile subscriber identity (S-TMSI), resume ID, etc), etc. can be included in a MsgA payload depending on the UE's RRC state (i.e. idle, inactive or connected) or events (such as scheduling request, physical downlink control channel (PDCCH) order, beam failure recovery, etc.) that triggered the RA procedure.

The information in MsgA payload may include one or more of a connection request message, a connection resume request message, a system information (SI) request message, a buffer status indication, a beam information (e.g. one or more downlink (DL) transmission (TX) beam ID(s) or a synchronization signal block (SSB) ID(s)), a beam failure recovery indication/information, a data indicator, a cell/BS/transmission reception point (TRP) switching indication, a connection re-establishment message, a reconfiguration complete or a handover complete message, etc. Note that any other information is not precluded. In case MsgA includes a dedicated RACH preamble, the UE ID (i.e. C-RNTI) can be skipped (i.e. not included) in MsgA payload. In this case, the gNB can identify the UE based on dedicated preamble and send a PDCCH addressed to C-RNTI in response. In the disclosure, the 4 step RA procedure refers to a legacy RA procedure comprising of Msg1 to Msg4 as described in TS 38.321 and 36.321 specifications.

1. Method to Handle Variable Size of Msg1

FIG. 1 illustrates an MsgA physical (PHY) protocol data unit (PDU) that is transmitted in a MsgA occasion (or MsgA resource) for a 2 step RA according to an embodiment of the disclosure.

Referring to FIG. 1, MsgA PHY PDU consists of a cyclic prefix (CP), a PRACH preamble sequence, a media access control (MAC) PDU, a cyclic redundancy check (CRC) and a guard time (GT). MsgA is another name of Msg1 for 2 step RACH.

Figure 2:
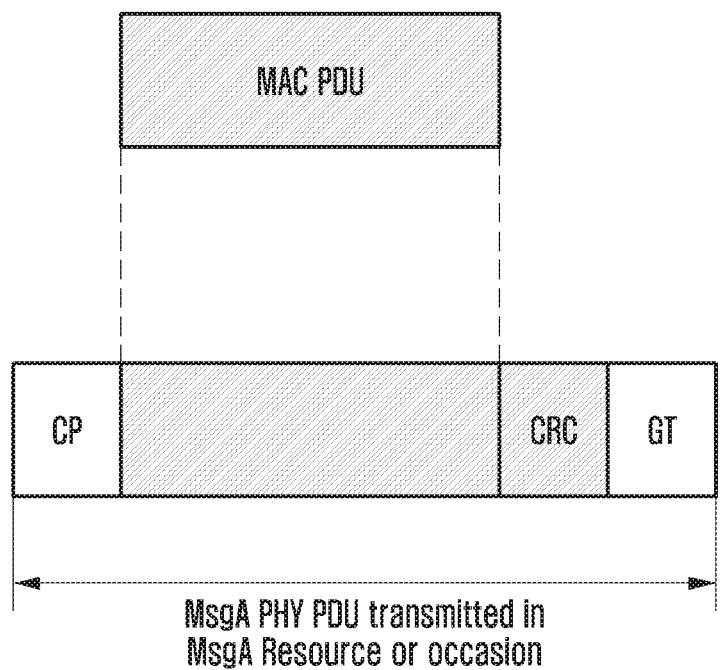
FIG. 2 illustrates another MsgA PHY PDU that is transmitted in a MsgA physical uplink shared channel (PUSCH) occasion (or MsgA PUSCH resource) according to an embodiment of the disclosure.

FIG. 2 illustrates another MsgA PHY PDU that is transmitted in a MsgA PUSCH occasion (or MsgA PUSCH resource) according to an embodiment of the disclosure.

In this case, only payload part of MsgA is transmitted in MsgA PUSCH occasion (or MsgA PUSCH resource). RA preamble part of MsgA is transmitted separately in PRACH occasion.

Referring to FIG. 2, MsgA PHY PDU for transmitting payload part of MsgA consists of a CP, a MAC PDU, a CRC and a GT. MsgA PUSCH occasion (or MsgA PUSCH resource) is a time/frequency occasion in which a MsgA payload is transmitted. MsgA PUSCH occasion (or MsgA PUSCH resource) comprises of one or more physical resource blocks (PRBs) in frequency domain and one or more orthogonal frequency division multiplexing (OFDM) symbols/slots in time domain.

In an embodiment, the MAC PDU in MsgA PHY PDU may include one or more of common control channel (CCCH) service data unit (SDU), a dedicated control channel (DCCH) SDU, a dedicated traffic channel (DTCH) SDU, a buffer status report (BSR) MAC control element (CE), a power headroom report (PHR) MAC CE, SSB information, a C-RNTI MAC CE, or padding.

In another embodiment, MsgA may include the UE ID (e.g., the random ID, the S-TMSI, the C-RNTI, the resume ID, etc.) along with a preamble in a first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of the random ID, the S-TMSI, the C-RNTI, the resume ID, the international mobile subscriber identity (IMSI), the idle mode ID, the inactive mode ID, etc. The UE ID can be different in different scenarios in which the UE performs the RA procedure. When the UE performs the RA after power on (before it is attached to the network), then the UE ID is the random ID. When the UE performs the RA in an IDLE state after it is attached to the network, the UE ID is the S-TMSI. If the UE has an assigned C-RNTI (e.g. in connected state), the UE ID is the C-RNTI. In case the UE is in an INACTIVE state, the UE ID is the resume ID. In addition to the UE ID, some addition ctrl information can be sent in MsgA. The control information may be included in the MAC PDU of the MsgA. The control information may include one or more of connection request indication, the connection resume request indication, the SI request indication, the buffer status indication, the beam information (e.g. one or more DL TX beam ID(s) or SSB ID(s)), the beam failure recovery indication/information, the data indicator, the cell/BS/TRP switching indication, the connection re-establishment indication, the reconfiguration complete or the handover complete message, etc. Note that any other control information is not precluded. In case MsgA includes the dedicated RACH preamble, the UE ID (i.e. C-RNTI) can be skipped (i.e. not included) in Msg1. In this case, the gNB can identify the UE based on the dedicated preamble and send a PDCCH addressed to the C-RNTI in response to the MsgA.

According to an embodiment of the disclosure, in order to support variable size of information to be transmitted in MsgA payload, multiple MsgA PUSCH resource pools (or RACH configurations) for a 2 step RA procedure may be configured. The MsgA PUSCH occasion (or PUSCH resource) in each of these multiple resource pools supports a different MsgA size (or the MAC PDU size or the size of information carried in MsgA). MsgA PUSCH resource pool(s) are signaled by the gNB in SI and/or dedicated RRC signaling.

Figure 3:
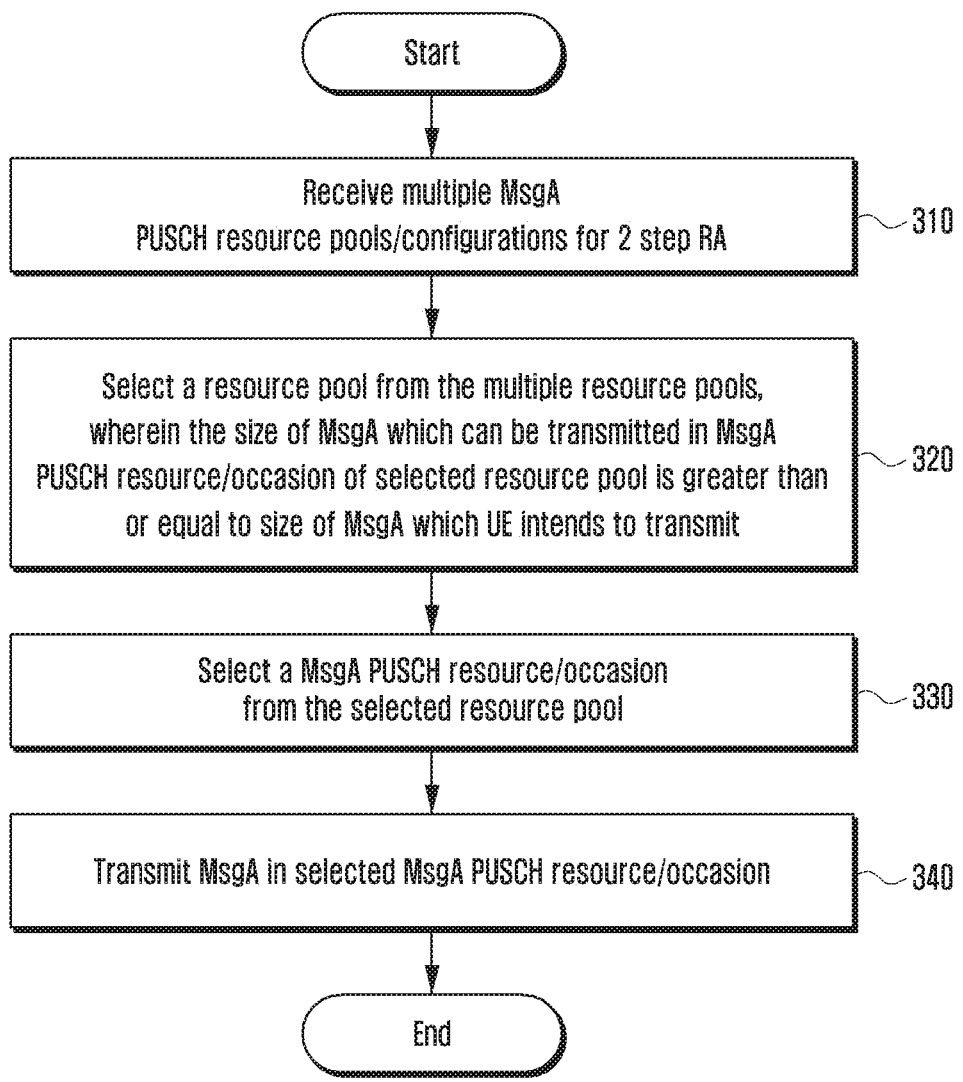
FIG. 3 illustrates a procedure performed by a UE to support variable size of information to be transmitted in Msg1 according to an embodiment of the disclosure.

FIG. 3 illustrates a procedure performed by a UE to support variable size of information to be transmitted in Msg1 according to an embodiment of the disclosure.

Referring to FIG. 3, the UE receives multiple MsgA PUSCH resource pools/configurations for the 2 step RA procedure at operation 310. For MsgA payload transmission, the UE selects a resource pool from the multiple resource pools at operation 320. The size of MsgA payload (or the MAC PDU size or the size of information carried in MsgA) which can be transmitted in MsgA PUSCH occasion (or PUSCH resource) of the selected resource pool is greater than or equal to the size of MsgA payload (or the MAC PDU size or the size of information carried in MsgA) which the UE intends to transmit. Each MsgA PUSCH occasion (or PUSCH resource) in the selected resource pool is mapped to one or more SSBs. The UE selects a MsgA PUSCH occasion (or PUSCH resource) from the selected resource pool corresponding to a suitable SSB at operation 330. An SSB is suitable if a SS block reference signal received power (RSRP) is greater than a threshold, where the threshold is signaled by the gNB. If no SSB is suitable, the UE can select MsgA PUSCH occasion (or PUSCH resource) from the selected resource pool corresponding to any SSB. If there are multiple MsgA PUSCH occasions (or PUSCH resources) corresponding to the selected SSB, the UE can select one MsgA PUSCH occasion randomly from multiple MsgA PUSCH occasions (or the PUSCH resources) corresponding to the selected SSB or the UE can select the earliest MsgA PSUCH occasion from multiple MsgA PUSCH occasions (or PUSCH resources) corresponding to the selected SSB. The UE then transmits MsgA payload (i.e. MsgA MAC PUD) in the selected MsgA PUSCH occasion (or PUSCH resource) at operation 340. In an embodiment of this procedure, multiple MsgA PUSCH resource pools refers to multiple MsgA PUS CH resource pools configured in the active UL bandwidth part (BWP) of selected UL carrier. Note that both normal UL (NUL) and supplementary UL (SUL) carrier can be configured in a cell. For RA on a serving cell configured with both NUL and SUL carrier, UE selects one of these carrier based on DL RSRP of that cell. If the RSRP of the DL pathloss reference (i.e. SSB) is less than a configured threshold, UE selects SUL: Otherwise NUL.

In an embodiment, in which the RACH preamble is also transmitted in MsgA, a list of RACH preambles which can be used is signaled by the gNB. Each RACH preamble in list is mapped to one or more SSBs. The UE selects the RACH preamble corresponding to a suitable SSB (an SSB is suitable if the SS block RSRP is greater than a threshold, where the threshold is signaled by the gNB). If no SSB is suitable, the UE can select the RACH preamble corresponding to any SSB. If there are multiple RACH preambles corresponding to the selected SSB, the UE can select one randomly from multiple RACH preambles corresponding to the selected SSB. In an embodiment, each MsgA PUSCH resource pool can be associated with different set of preambles, so that gNB can identify MsgA PUSCH resource used by UE and decode MsgA payload accordingly. In this case, the UE selects preamble corresponding to selected SSB from preambles associated with selected MsgA PUSCH resource pool. In an embodiment, two groups (group A and group B) of RA preambles can be signaled. The UE selects one group of preamble based on MsgA payload size, or based on MsgA payload size and pathloss (if group is configured and if the MsgA payload size (UL data available for transmission plus MAC header and, where required, MAC CEs) is greater than SizeGroupA and the pathloss is less than a threshold or if the RA procedure was initiated for the CCCH logical channel and the CCCH SDU size plus MAC subheader is greater than SizeGroupA, preamble group B is selected. Otherwise group A is selected. SizeGroupA is configured by gNB). In this case, the UE selects preamble corresponding to selected SSB from preambles associated with selected preamble group.

So far MsgA transmission in 2 step RA procedure,

UE selects the UL carrier (NUL or SUL) upon initiation of RA procedure.

UE selects SSB for every MsgA transmission during the RA procedure.

UE selects PUSCH resource pool from PUSCH resource pool(s) of active UL BWP as described above. This step may be performed only once during the RA procedure.

UE selects PUSCH occasion corresponding to selected SSB from selected PUSCH resource pool.

UE selects preamble corresponding to selected SSB from preambles of selected PUSCH resource pool. Alternately, UE selects preamble group and then UE selects preamble corresponding to selected SSB from preambles of selected preamble group.

UE selects PRACH occasion corresponding to selected SSB. PRACH occasions for 2 step RA are mapped to SSBs as in 4 step RA. If there are multiple RACH occasions corresponding to selected SSB, UE can select one RACH occasion randomly from multiple RACH occasions corresponding to selected SSB or UE can select the earliest RACH occasion from multiple RACH occasions corresponding to selected SSB.

UE then transmits selected preamble in selected PRACH occasion. UE transmits MsgA payload in selected PUSCH occasion.

Figure 4:
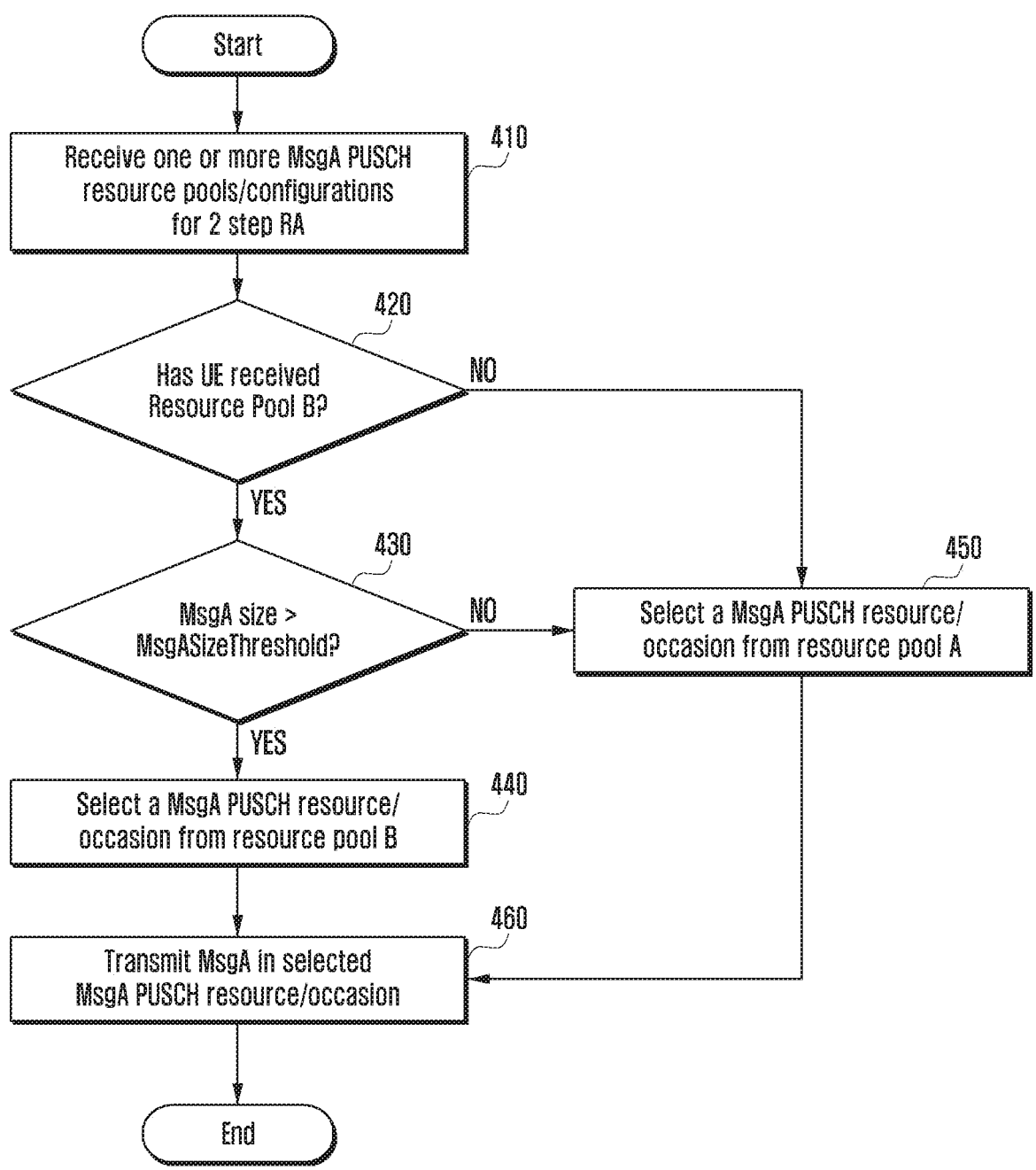
FIG. 4 is an illustration in which next generation node B (gNB) can signal up to two MsgA PUSCH resource pools according to an embodiment of the disclosure.

FIG. 4 is an illustration in which a gNB can signal up to two MsgA PUSCH resource pools (say Resource Pool A and Resource Pool B) according to an embodiment of the disclosure.

Referring to FIG. 4, the UE receives one or more MsgA PUSCH resource pools/configurations for a 2 step RA at operation 410. The Resource Pool A should be signaled, but the Resource Pool B can be optionally signaled. The UE determines whether the Resource Pool B has been signaled at operation 420. In addition, the UE determines whether a MsgA payload size (or the MAC PDU size or the size of information carried in MsgA) is greater than a threshold, i.e. MsgASizeThreshold at operation 430. If the Resource Pool B is signaled and if the MsgA payload size (or the MAC PDU size or the size of information carried in Msg1) is greater than the threshold, i.e. MsgASizeThreshold, the UE selects the MsgA PUSCH resource (or PUSCH occasion) from Resource Pool B at operation 440. Otherwise, the UE selects the MsgA PUSCH resource from the Resource Pool A at operation 450. MsgASizeThreshold is signaled by the gNB. Each MsgA PUSCH occasion (or PUSCHresource) in the selected resource pool is mapped to one or more SSBs. the UE selects a MsgA PUSCH occasion (or PUSCH resource) from the selected resource pool corresponding to a suitable SSB (an SSB is suitable if the SS block RSRP is greater than the threshold, where the threshold is signaled by the gNB). If no SSB is suitable, the UE can select MsgA PUSCH occasion (or PUSCH resource) from the selected resource pool corresponding to any SSB. If there are multiple MsgA PUSCH occasions (or PUSCH resources) corresponding to the selected SSB, the UE can select one MsgA PUSCH occasion randomly from multiple MsgA PUSCH occasions (or the PUSCH resources) corresponding to the selected SSB or the UE can select the earliest MsgA PUSCH occasion from multiple MsgA PUSCH occasions (or PUSCH resources) corresponding to the selected SSB. The UE then transmits MsgA payload (or MAC PDU) in the selected MsgA PUSCH occasion (or PUSCH resource) at operation 460. In an embodiment of this procedure, MsgA PUSCH resource pools refers to MsgA PUSCH resource pools configured in the active UL BWP of selected UL carrier. Note that both NUL and SUL carrier can be configured in a cell. For RA on a serving cell configured with both NUL and SUL carrier, UE selects one of these carrier based on DL RSRP of that cell. If the RSRP of the DL pathloss reference (i.e. SSB) is less than a configured threshold, UE selects SUL: Otherwise NUL.

Figure 5:
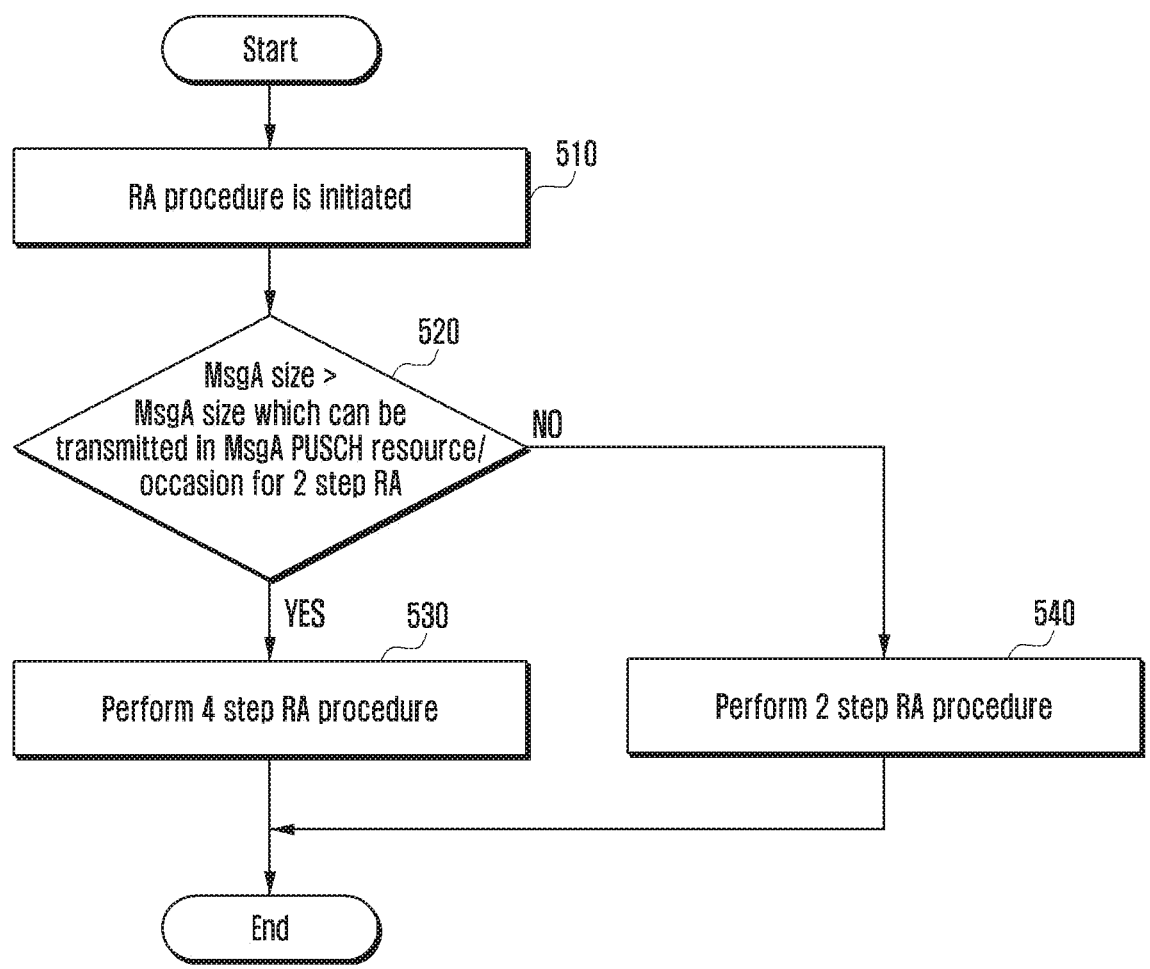
FIG. 5 is a flowchart that illustrates UE operations for performing an RA procedure according to an embodiment of the disclosure.

FIG. 5 is a flowchart that illustrates UE operations for performing an RA procedure according to an embodiment of the disclosure.

Referring to FIG. 5, upon initiation of the RA procedure at operation 510, the UE determines whether MsgA payload size (or the MAC PDU size or the size of information carried in MsgA) for the 2 step RA is greater than MsgA payload size (or the MAC PDU size or the size of information carried in MsgA) that can be transmitted in the MsgA PUSCH resource of a PUSCH resource pool (or of any MsgA PUSCH resource pool if multiple PUSCH resource pools are configured) for the 2 step RA at operation 520. If the MsgA paylaod size (or the MAC PDU size or the size of information carried in MsgA paylaod) for the 2 step RA is greater than the MsgA payload size (or the MAC PDU size or the size of information carried in MsgA payload) that can be transmitted in the MsgA PUSCH resource of PUSCH resource pool (or of any Msg1 resource pool if the multiple PUSCH resource pools are configured) for the 2 step RA, the UE performs the 4 step RA procedure at operation 530, as shown in FIG. 5. Otherwise, the UE performs the 2 step RA procedure at operation 540.

2. Method to Handle Reliability of MsgA

Unlike the 4 step RACH procedure, MsgA of the 2 step RA procedure includes information bits. In the 4 step RACH procedure, these information bits are transmitted using Msg3 wherein a hybrid automatic repeat request (HARQ) or a transmission time interval (TTI) bundling is used for the Msg3 transmission. The HARQ or the TTI bundling ensures that Msg3 can be reliably transmitted by the UEs near and far away (i.e. at cell edge) from the gNB. In case of MsgA, mechanism is needed so that MsgA can be reliably transmitted by the UEs near and far away from the gNB.

According to an embodiment of the disclosure, in order to support reliable transmission of MsgA by the UEs near and far away from the gNB, the multiple MsgA PUSCH resource pools for the 2 step RA procedure may be configured. The MsgA PUSCH occasion (or PUSCH resource) in each of these multiple resource pools supports different a number of repetitions of MsgA information (other than CP and GT). The number of repetitions in each resource pool is indicated in the resource pool configuration. The MsgA PUSCH resource pool(s) are signaled by the gNB in the system information and/or the dedicated RRC signaling. The gNB also indicates the DL RSRP range for which a particular resource pool can be selected. In an embodiment of this procedure, multiple MsgA PUSCH resource pools refers to multiple MsgA PUSCH resource pools configured in the active UL BWP of selected UL carrier. Note that both NUL and SUL carrier can be configured in a cell. For RA on a serving cell configured with both NUL and SUL carrier, UE selects one of these carrier based on DL RSRP of that cell.

Figure 6:
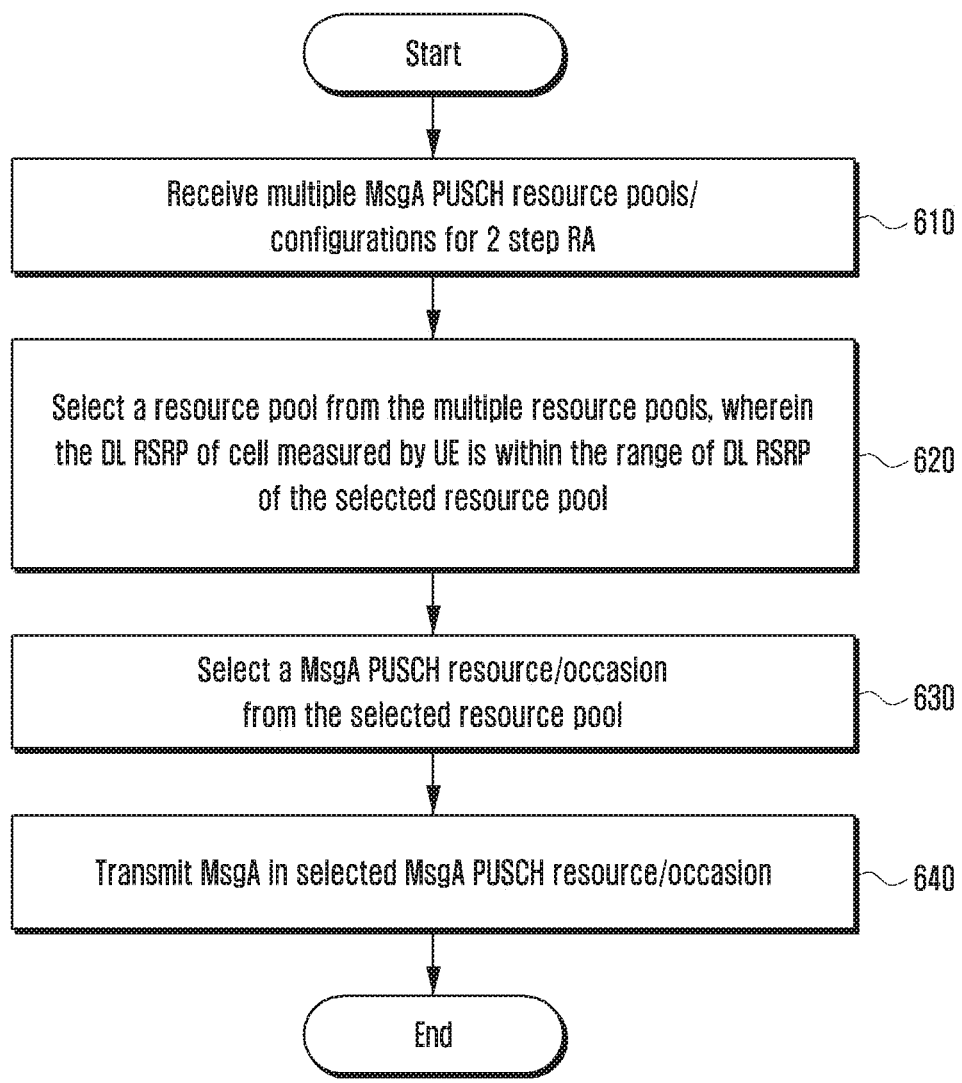
FIG. 6 illustrates a procedure performed by a UE to support reliable transmission of MsgA according to an embodiment of the disclosure.

FIG. 6 illustrates a procedure performed by a UE to support reliable transmission of MsgA according to an embodiment of the disclosure.

Referring to FIG. 6, the UE receives multiple MsgA PUSCH resource pools/configurations for the 2 step RA procedure at operation 610. For the MsgA payload transmission, the UE selects a resource pool from the multiple resource pools at operation 620, wherein the DL RSRP measured by the UE is within the range of the DL RSRP of the selected resource pool. The range of DL RSRP for which each resource pool can be used is signaled by the gNB. For example, three resource pools are configured. Resource pool 1 is used when DL RSRP<=threshold 1. Resource pool 2 is used when threshold 1<DL RSRP<=threshold 2. Resource pool 3 is used when threshold 2<DL RSRP. The thresholds 1 and 2 are signaled by the gNB. In an embodiment, the UE performs the selection of resource pool at the beginning of the RA procedure that is for $1^{st}$ MsgA transmission and then uses the same resource pool for all MsgA transmissions during the RA procedure. In another embodiment, the UE performs the selection of resource pool before each MsgA transmission or the RA attempt during the RA procedure. In an embodiment, the DL RSRP used for resource pool selection is the RSRP derived from SSB measurements of cell on which MsgA is transmitted. In another embodiment, the DL RSRP used for resource pool selection is the RSRP of the DL pathloss reference. The DL pathloss reference can be synchronization signal, i.e. SSB. The DL pathloss reference can be SSB which is selected for selecting PRACH resource (preamble, PRACH occasion) and PUSCH resource for MsgA transmission. In an embodiment, the DL RSRP used for the resource pool selection is the synchronization signal-RSRP (SS-RSRP) of a best SSB (i.e. a highest RSRP value among the SS-RSRP value of all SSBs). In another embodiment, the DL RSRP used for the resource pool selection is the DL RSRP of the cell on which MsgA is transmitted. It is obtained as follows: maximum number (nrofSS-ResourcesToAverage) of beams (or S SBs) and a threshold (absThreshSS-Consolidation) are signaled by the gNB. The UE obtains them from the SI or RRC signaling. If the highest SS-RSRP value among the SS-RSRP values of all SSBs (or beams) is below the threshold, the RSRP of the cell is the highest SS-RSRP value among the SS-RSRP values of all SSBs. Otherwise, the RSRP of the cell is the linear average of the SS-RSRP of up to the maximum number (nrofSS-ResourcesToAverage) of the highest SS-RSRP values above the threshold.

Each MsgA PUSCH occasion (or PUSCH resource) in the selected resource pool is mapped to one or more SSBs. The UE selects a MsgA PUSCH occasion (or PUSCH resource) from the selected resource pool corresponding to a suitable SSB at operation 630. An SSB is suitable if SS block RSRP is greater than a threshold, where the threshold is signaled by the gNB. If no SSB is suitable, the UE can select MsgA PUSCH occasion (or PUSCH resource) from the selected resource pool corresponding to any SSB. If there are multiple MsgA PUSCH occasions (or PUSCH resources) corresponding to the selected SSB, the UE can select one MsgA PUSCH occasion randomly from multiple MsgA PUSCH occasions (or PUSCH resources) corresponding to the selected SSB or the UE can select the earliest MsgA PUSCH occasion from multiple MsgA PUSCH occasions (or PUSCH resources) corresponding to the selected SSB. The UE then transmits MsgA in the selected MsgA PUSCH occasion (or PUSCH resource) at operation 640. In an embodiment of this procedure, multiple MsgA PUSCH resource pools refers to multiple MsgA PUSCH resource pools configured in the active UL BWP of selected UL carrier. Note that both NUL and SUL carrier can be configured in a cell. For RA on a serving cell configured with both NUL and SUL carrier, UE selects one of these carrier based on DL RSRP of that cell.

In an embodiment, in which the RACH preamble is also transmitted in MsgA, a list of RACH preambles which can be used is signaled by the gNB. Each RACH preamble in list is mapped to one or more SSBs. The UE selects a RACH preamble corresponding to a suitable SSB (an SSB is suitable if the SS block RSRP is greater than a threshold, where the threshold is signaled by the gNB). If no SSB is suitable, the UE can select the RACH preamble corresponding to any SSB. If there are multiple RACH preambles corresponding to the selected SSB, the UE can select one randomly from multiple RACH preambles corresponding to the selected SSB. In an embodiment, each MsgA PUSCH resource pool can be associated with different set of preambles, so that gNB can identify MsgA PUSCH resource used by UE and decode MsgA payload accordingly. In this case, the UE selects preamble corresponding to selected SSB from preambles associated with selected MsgA PUSCH resource pool. In an embodiment, two groups of RA preambles can be signaled. The UE selects one group of preamble based on MsgA payload size, or based on MsgA payload size and pathloss (if group is configured and if the MsgA payload size (UL data available for transmission plus MAC header and, where required, MAC CEs) is greater than SizeGroupA and the pathloss is less than a threshold or if the RA procedure was initiated for the CCCH logical channel and the CCCH SDU size plus MAC subheader is greater than SizeGroupA, preamble group B is selected. Otherwise group A is selected. SizeGroupA is configured by gNB). In this case, the UE selects preamble corresponding to selected SSB from preambles associated with selected preamble group. So far MsgA transmission in 2 step RA procedure, UE selects the UL carrier (NUL or SUL) upon initiation of RA procedure.

UE selects SSB for every MsgA transmission during the RA procedure.

UE selects PUSCH resource pool from PUSCH resource pool(s) of active UL BWP as described above. This step may be performed only once during the RA procedure.

UE selects PUSCH occasion corresponding to selected SSB from selected PUSCH resource pool.

UE selects preamble corresponding to selected SSB from preambles of selected PUSCH resource pool. Alternately, UE selects preamble group and then UE selects preamble corresponding to selected SSB from preambles of selected preamble group.

UE selects PRACH occasion corresponding to selected SSB. PRACH occasions for 2 step RA are mapped to SSBs as in 4 step RA.

UE then transmits selected preamble in selected PRACH occasion. UE transmits MsgA payload in selected PUSCH occasion.

Figure 7:
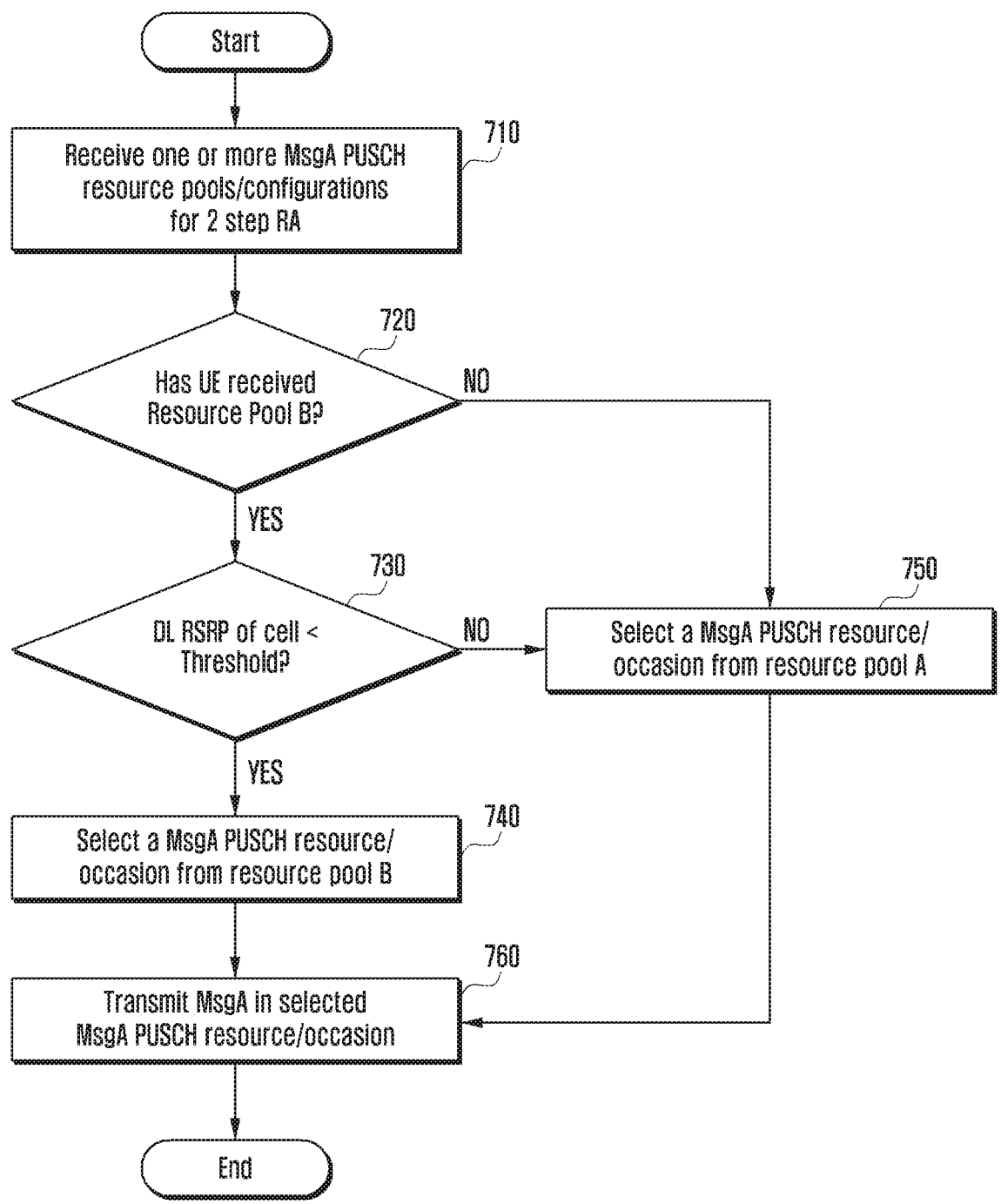
FIG. 7 is an illustration of another embodiment of disclosure in which gNB can signal up to two MsgA PUSCH resource pools according to an embodiment of the disclosure.

FIG. 7 is an illustration of another embodiment of disclosure in which a gNB can signal up to two MsgA PUSCH resource pools (say Resource Pool A and Resource Pool B) according to an embodiment of the disclosure.

Referring to FIG. 7, the UE receives one or more MsgA PUSCH resource pools/configurations for the 2 step RA at operation 710. Resource Pool A should be signaled, but Resource Pool B can be optionally signaled. The UE determines whether the Resource pool B has been signaled at operation 720. In addition, the UE determines whether the DL RSRP of the cell (on which the UE will transmit MsgA) is less than a Threshold at operation 730. If the Resource Pool B is signaled and if the DL RSRP of the cell (on which the UE will transmit MsgA) is less than a Threshold, the UE selects the MsgA PUSCH resource from the Resource Pool B at operation 740. Otherwise, the UE selects the MsgA PUSCH resource from the Resource Pool A at operation 750. The Threshold is signaled by the gNB. Each MsgA PUSCH occasion (or PUSCH resource) in the selected resource pool is mapped to one or more SSBs. In an embodiment, the DL RSRP used for resource pool selection is the RSRP derived from SSB measurements of cell on which MsgA is transmitted. In another embodiment, the DL RSRP used for resource pool selection is the RSRP of the DL pathloss reference. The DL pathloss reference can be synchronization signal, i.e. SSB. The DL pathloss reference can be SSB which is selected for selecting PRACH resource (preamble, PRACH occasion) and PUSCH resource for MsgA transmission. In an embodiment, the DL RSRP used for the resource pool selection is the SS-RSRP of the best SSB (i.e. the highest RSRP value among the SS-RSRP value of all SSBs). In another embodiment, the DL RSRP used for resource pool selection is the DL RSRP of the cell on which Msg1 is transmitted. It is obtained as follows: a maximum number (nrofSS-ResourcesToAverage) of beams (or SSBs) and a threshold (absThreshSS-Consolidation) are signaled by the gNB. The UE obtains them from SI or RRC signaling. If the highest SS-RSRP value among the SS-RSRP values of all SSBs (or beams) is below the threshold, the RSRP of the cell is the highest S the S-RSRP value among the SS-RSRP values of all SSBs. Otherwise, RSRP of the cell is the linear average of the SS-RSRP of up to the maximum number (nrofSS-ResourcesToAverage) of the highest SS-RSRP values above the threshold. The UE selects a MsgA PUSCH occasion (or PUSCH resource) from the selected resource pool corresponding to a suitable SSB (an SSB is suitable if the SS block RSRP is greater than a threshold, where the threshold is signaled by the gNB). If no SSB is suitable, the UE can select MsgA PUSCH occasion (or resource) from the selected resource pool corresponding to any SSB. If there are multiple MsgA PUSCH occasions (or PUSCH resources) corresponding to the selected SSB, the UE can select one MsgA PUSCH occasion randomly from multiple MsgA PUSCH occasions (or PUSCH resources) corresponding to the selected SSB or the UE can select the earliest MsgA PUSCH occasion from multiple MsgA PUSCH occasions (or PUSCH resources) corresponding to the selected SSB. The UE then transmits MsgA payload (or MAC PDU) in the selected MsgA PUSCH occasion (or PUSCH resource) at operation 760. In an embodiment of this procedure, MsgA PUSCH resource pools refers to MsgA PUSCH resource pools configured in the active UL BWP of selected UL carrier. Note that both NUL and SUL carrier can be configured in a cell. For RA on a serving cell configured with both NUL and SUL carrier, UE selects one of these carrier based on DL RSRP of that cell.

Figure 8:
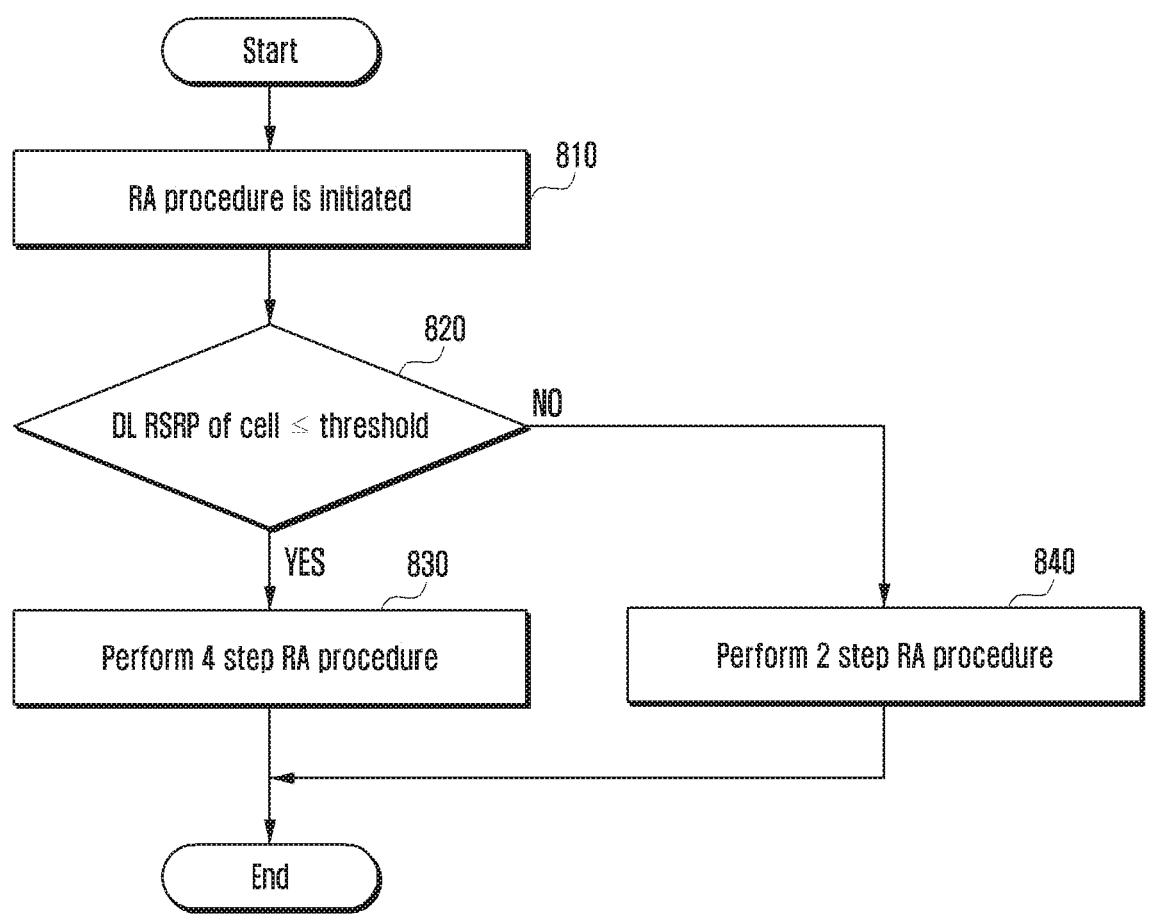
FIG. 8 illustrates a procedure performed by a UE to support reliable transmission of MsgA according to another embodiment of the disclosure.

FIG. 8 illustrates a procedure performed by a UE to support reliable transmission of MsgA according to another embodiment of the disclosure.

This procedure is applied when both 2 step and 4 step RA are supported in a cell on which RA is initiated and UE supports both 2 step and 4 step RA procedure. In a system supporting BWPs: in RRC IDLE/INACTIVE state, UE performs RA procedure over initial DL BWP and initial UL BWP of camped cell. In case camped cell is configured with both NUL and SUL, UE selects an UL carrier based on DL RSRP of camped cell (e.g. if the RSRP of the DL pathloss reference (i.e. SSB) is less than a configured threshold, UE selects SUL; otherwise NUL), and initial UL BWP for RA procedure is the initial UL BWP of selected UL carrier. In case camped cell is configured with only NUL, UE selects NUL, and initial UL BWP for RA procedure is the initial UL BWP of NUL. So UE in RRC IDLE/INACTIVE applies this procedure when both 2 step and 4 step RA are supported (i.e. SI received from camped cell includes both 2 step and 4 step RA configuration) in initial UL BWP of selected UL carrier. In RRC CONNECTED state, UE performs RA procedure over active DL BWP and active UL BWP of serving cell on which RA is initiated. In case serving cell on which RA is initiated is configured with both NUL and SUL, active UL BWP for RA procedure is the active UL BWP of selected UL carrier. UL carrier (NUL or SUL) to be used can be indicated by gNB, and if not indicated, UE selects an UL carrier based on DL RSRP of serving cell (e.g. if the RSRP of the DL pathloss reference (i.e. SSB) is less than a configured threshold, UE selects SUL; otherwise NUL) on which RA is initiated. In case serving cell on which RA is initiated is configured with only NUL, UE selects NUL. So UE in RRC CONNECTED applies this procedure when both 2 step and 4 step RA are supported (i.e. dedicated RRC signaling received gNB includes both 2 step and 4 step RA configuration) for active UL BWP of selected UL carrier.

gNB signals a DL RSRP threshold for selecting 2/4 step RA procedure. In an embodiment, the DL RSRP threshold can be separately configured for NUL carrier and SUL carrier, and UE uses the DL RSRP threshold corresponding to UL carrier selected for RA. In another embodiment, the DL RSRP threshold can be included in RA configuration wherein the RA configuration is signaled per UL BWP and UE uses the DL RSRP threshold included in RA configuration corresponding to active UL BWP (note that in RRC IDLE/INACTIVE, initial UL BWP is the active UL BWP). In another embodiment, DL RSRP threshold can be cell specific, i.e. common for all BWPs, but separately configured for NUL and SUL. In another embodiment, DL RSRP threshold is common for all BWPs and UL carriers of a cell.

In an embodiment of the disclosure, UE measures the DL RSRP of serving cell on which RA is initiated (i.e. the cell on which UE will transmit Msg1 for 4 step RA and MsgA for 2 step RA). In an embodiment, the DL RSRP is the RSRP derived from SSB measurements of cell on which RA is initiated (i.e. the cell on which UE will transmit Msg1 for 4 step RA and MsgA for 2 step RA). In another embodiment, the DL RSRP is the RSRP of the DL pathloss reference. The DL pathloss reference can be synchronization signal, i.e. SSB. The DL pathloss reference can be SSB which is selected for selecting PRACH resource (preamble, PRACH occasion). In another embodiment, the DL RSRP is the SS-RSRP of best SSB (i.e. highest RSRP value among the SS-RSRP value of all SSBs). In another embodiment, the DL RSRP is the DL RSRP of cell on which RA is initiated, and it is obtained as follows: maximum number (nrofSS-ResourcesToAverage) of beams (or SSBs) and a threshold (absThreshSS-Consolidation) are signaled by gNB. UE obtains them from SI or RRC signaling. If the highest SS-RSRP value among the SS-RSRP values of all SSBs (or beams) is below the threshold, DL RSRP of cell is the highest SS-RSRP value among the SS-RSRP values of all SSBs. Otherwise, DL RSRP of cell is the linear average of the SS-RSRP of up to the maximum number (nrofSS-ResourcesToAverage) of highest SS-RSRP values above the threshold. In an embodiment, DL RSRP of cell can be channel state information-RSRP (CSI-RSRP).

If the DL RSRP of the serving cell on which RA is initiated (i.e. the cell on which the UE will transmit Msg1 for 4 step RA and MsgA for 2 step RA) measured by the UE is less than or equal to DL RSRP threshold, the UE performs the 4 step RA procedure. In an embodiment of the disclosure, if DL RSRP of serving cell on which RA is initiated (i.e. the cell on which UE will transmit Msg1 for 4 step RA and MsgA for 2 step RA) measured by UE is greater than DL RSRP threshold, UE performs 2 step RA procedure. The DL RSRP threshold is signaled by the gNB (as described above). Referring to FIG. 8, upon initiation of the RA procedure at operation 810, the UE checks if the DL RSRP of the serving cell (i.e., the cell on which the UE will transmit Msg1 for 4 step RA and MsgA for 2 step RA) is less than or equal to DL RSRP threshold or not at operation 820. If yes, the UE performs the 4 step RA procedure at operation 830. Otherwise (i.e. DL RSRP of serving cell is greater than DL RSRP threshold) UE performs the 2 step RA procedure at operation 840.

In an alternate embodiment of the disclosure, if DL RSRP of serving cell on which RA is initiated (i.e. the cell on which UE will transmit Msg1 for 4 step RA and MsgA for 2 step RA) measured by UE is greater than DL RSRP threshold, UE can perform either 4 step or 2 step RA procedure. In this case, selection of 4 step or 2 step RA procedure can be up to UE implementation. Alternately, in this case, UE can randomly select 4 step or 2 step RA procedure. Alternately, gNB can signal a distribution factor. UE randomly selects a number within a specified range, and if the selected number is greater than the distribution factor, UE selects 2 step RA procedure, otherwise UE selects 4 step RA procedure.

In an alternate embodiment of the disclosure, selection of 2/4 step RA procedure can be based on DL reference signal received quality (RSRQ) instead of DL RSRP.

In an embodiment of the disclosure, if the DL RSRP of the serving cell on which RA is initiated (i.e. the cell on which the UE will transmit Msg1 for 4 step RA and MsgA for 2 step RA) measured by the UE is less than DL RSRP threshold, the UE performs the 4 step RA procedure. In an embodiment of the disclosure, if DL RSRP of serving cell on which RA is initiated (i.e. the cell on which UE will transmit Msg1 for 4 step RA and MsgA for 2 step RA) measured by UE is greater than or equal to DL RSRP threshold, UE performs 2 step RA procedure. The DL RSRP threshold is signaled by the gNB (as described above). In an alternate embodiment of the disclosure, if DL RSRP of serving cell on which RA is initiated (i.e. the cell on which UE will transmit Msg1 for 4 step RA and MsgA for 2 step RA) measured by UE is greater than equal to DL RSRP threshold, UE can perform either 4 step or 2 step RA procedure. In this case, selection of 4 step or 2 step RA procedure can be up to UE implementation. Alternately, in this case, UE can randomly select 4 step or 2 step RA procedure. Alternately, gNB can signal a distribution factor. UE randomly selects a number within a specified range, and if the selected number is greater than the distribution factor, UE selects 2 step RA procedure, otherwise UE selects 4 step RA procedure.

Figure 9:
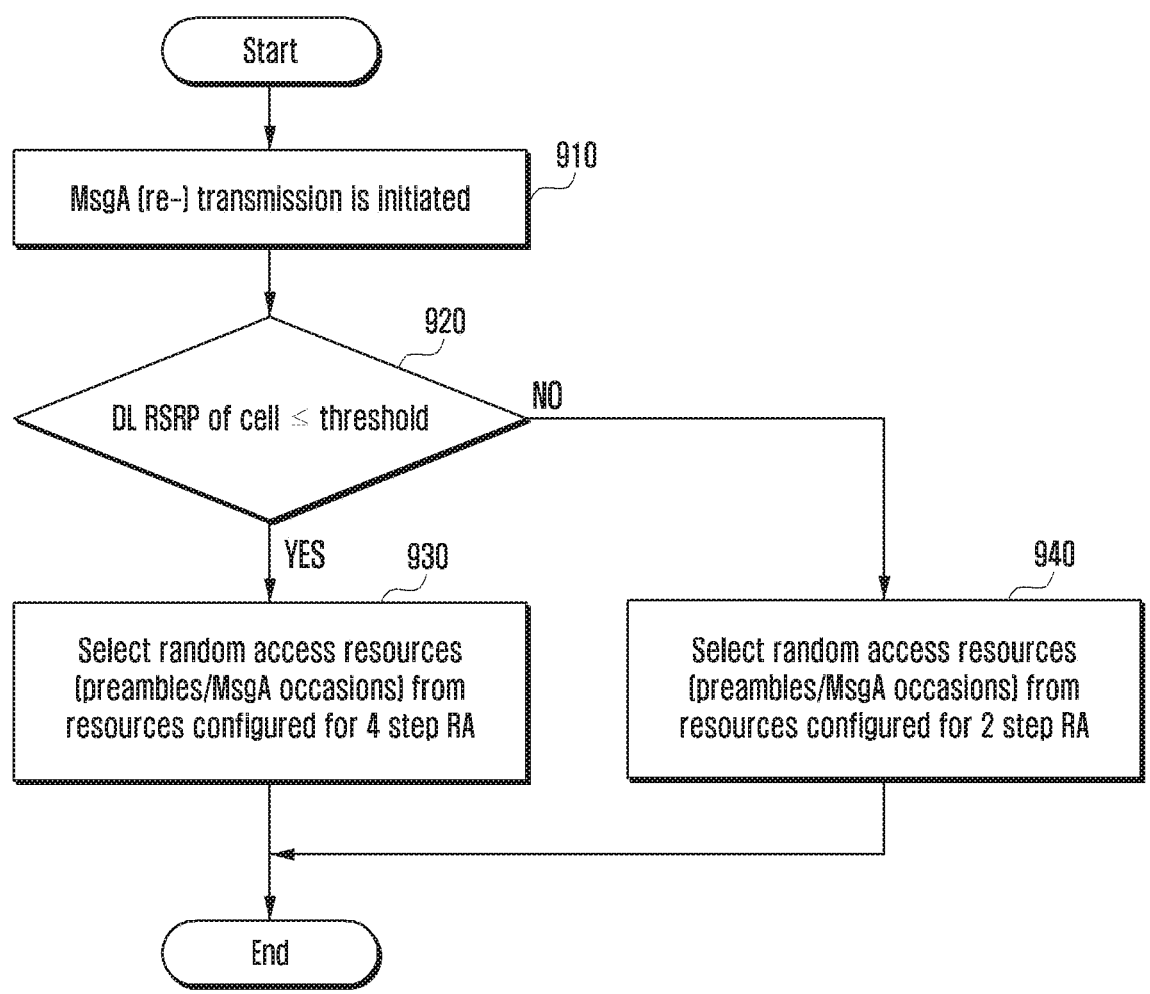
FIG. 9 illustrates a procedure performed by a UE to support reliable transmission of MsgA according to another embodiment of the disclosure.

FIG. 9 illustrates a procedure performed by a UE to support reliable transmission of MsgA according to another embodiment of the disclosure.

This procedure is applied when both 2 step and 4 step RA are supported in a cell on which RA is initiated and UE supports both 2 step and 4 step RA procedure. In a system supporting BWPs: in RRC IDLE/INACTIVE state, UE performs RA procedure over initial DL BWP and initial UL BWP of camped cell. In case camped cell is configured with both NUL and SUL, UE selects an UL carrier based on DL RSRP of camped cell (e.g. if the RSRP of the DL pathloss reference (i.e. SSB) is less than a configured threshold, UE selects SUL; otherwise NUL), and initial UL BWP for RA procedure is the initial UL BWP of selected UL carrier. In case camped cell is configured with only NUL, UE selects NUL, and initial UL BWP for RA procedure is the initial UL BWP of NUL. So UE in RRC IDLE/INACTIVE applies this procedure when both 2 step and 4 step RA are supported (i.e. SI received from camped cell includes both 2 step and 4 step RA configuration) in initial UL BWP of selected UL carrier. In RRC CONNECTED state, UE performs RA procedure over active DL BWP and active UL BWP of serving cell on which RA is initiated. In case serving cell on which RA is initiated is configured with both NUL and SUL, active UL BWP for RA procedure is the active UL BWP of selected UL carrier. UL carrier (NUL or SUL) to be used can be indicated by gNB, and if not indicated, UE selects an UL carrier based on DL RSRP of serving cell (e.g. if the RSRP of the DL pathloss reference (i.e. SSB) is less than a configured threshold, UE selects SUL; otherwise NUL) on which RA is initiated. In case serving cell on which RA is initiated is configured with only NUL, UE selects NUL. So UE in RRC CONNECTED applies this procedure when both 2 step and 4 step RA are supported (i.e. dedicated RRC signaling received gNB includes both 2 step and 4 step RA configuration) for active UL BWP of selected UL carrier.

gNB signals a DL RSRP threshold for selecting 2/4 step RA procedure. In an embodiment, the DL RSRP threshold can be separately configured for NUL carrier and SUL carrier, and UE uses the DL RSRP threshold corresponding to UL carrier selected for RA. In another embodiment, the DL RSRP threshold can be included in RA configuration wherein the RA configuration is signaled per UL BWP and UE uses the DL RSRP threshold included in RA configuration corresponding to active UL BWP (note that in RRC IDLE/INACTIVE, initial UL BWP is the active UL BWP). In another embodiment, DL RSRP threshold can be cell specific, i.e. common for all BWPs, but separately configured for NUL and SUL. In another embodiment, DL RSRP threshold is common for all BWPs and UL carriers of a cell.

In an embodiment of the disclosure, UE measures the DL RSRP of serving cell on which RA is initiated (i.e. the cell on which UE will transmit Msg1 for 4 step RA and MsgA for 2 step RA). In an embodiment, the DL RSRP is the RSRP derived from SSB measurements of cell on which RA is initiated (i.e. the cell on which UE will transmit Msg1 for 4 step RA and MsgA for 2 step RA). In another embodiment, the DL RSRP is the RSRP of the DL pathloss reference. The DL pathloss reference can be synchronization signal, i.e. SSB. The DL pathloss reference can be SSB which is selected for selecting PRACH resource (preamble, PRACH occasion) and PUSCH resource for MsgA transmission. In another embodiment, the DL RSRP is the SS-RSRP of best SSB (i.e. highest RSRP value among the SS-RSRP value of all SSBs). In another embodiment, the DL RSRP is the DL RSRP of cell on which RA is initiated (i.e. the cell on which UE will transmit Msg1 for 4 step RA and MsgA for 2 step RA), and it is obtained as follows: maximum number (nrofSS-ResourcesToAverage) of beams (or SSBs) and a threshold (absThreshSS-Consolidation) are signaled by gNB. UE obtains them from SI or RRC signaling. If the highest SS-RSRP value among the SS-RSRP values of all SSBs (or beams) is below the threshold, DL RSRP of cell is the highest SS-RSRP value among the SS-RSRP values of all SSBs. Otherwise, DL RSRP of cell is the linear average of the SS-RSRP of up to the maximum number (nrofSS-ResourcesToAverage) of highest SS-RSRP values above the threshold. In an embodiment, DL RSRP of cell can be CSI-RSRP.

In this procedure as shown in FIG. 9 of the disclosure, the UE can perform this selection between 2 step and 4 step based on the DL RSRP of the cell on which RA is initiated before each RA attempt of the RA procedure instead of at the beginning of RA procedure.

Referring to FIG. 9, upon RA (re)transmission, the UE determines whether the DL RSRP of the cell on which RA is initiated (i.e. the cell on which UE will transmit Msg1 for 4 step RA and MsgA for 2 step RA) is less than or equal to a threshold or not at operation 920. If the DL RSRP of the serving cell (i.e. the cell on which UE will transmit Msg1 for 4 step RA and MsgA for 2 step RA) is less than or equal to a threshold, the UE selects RA resources (preambles/RA occasions) from resources configured for the 4 step RA at operation 930. Otherwise (i.e. DL RSRP of serving cell on which RA is initiated is greater than a threshold), the UE selects the RA resources (preambles/MsgA PUSCH occasions/RA occasions) from the resources configured for the 2 step RA at operation 940. This is beneficial as channel conditions may change during the RA procedure.

Figure 10:
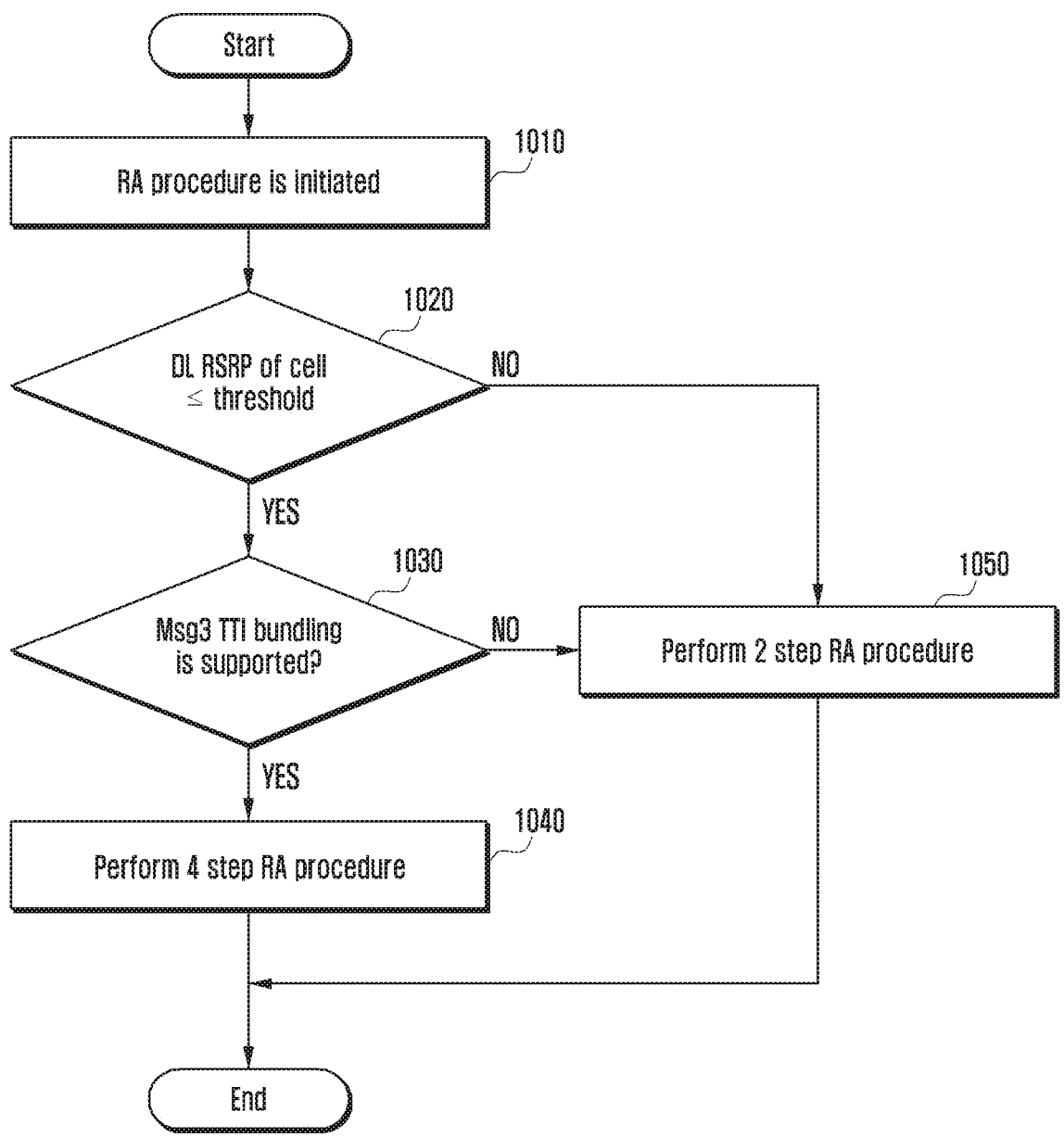
FIG. 10 illustrates a procedure performed by a UE to support reliable transmission of MsgA according to another embodiment of the disclosure.

FIG. 10 illustrates a procedure performed by a UE to support reliable transmission of MsgA according to another embodiment of the disclosure.

This procedure is applied when both 2 step and 4 step RA are supported in a cell on which RA is initiated and UE supports both 2 step and 4 step RA procedure. In a system supporting BWPs: in RRC IDLE/INACTIVE state, UE performs RA procedure over initial DL BWP and initial UL BWP of camped cell. In case camped cell is configured with both NUL and SUL, UE selects an UL carrier based on DL RSRP of camped cell (e.g. if the RSRP of the DL pathloss reference (i.e. SSB) is less than a configured threshold, UE selects SUL; otherwise NUL), and initial UL BWP for RA procedure is the initial UL BWP of selected UL carrier. In case camped cell is configured with only NUL, UE selects NUL, and initial UL BWP for RA procedure is the initial UL BWP of NUL. So UE in RRC IDLE/INACTIVE applies this procedure when both 2 step and 4 step RA are supported (i.e. SI received from camped cell includes both 2 step and 4 step RA configuration) in initial UL BWP of selected UL carrier. In RRC CONNECTED state, UE performs RA procedure over active DL BWP and active UL BWP of serving cell on which RA is initiated. In case serving cell on which RA is initiated is configured with both NUL and SUL, active UL BWP for RA procedure is the active UL BWP of selected UL carrier. UL carrier (NUL or SUL) to be used can be indicated by gNB, and if not indicated, UE selects an UL carrier based on DL RSRP of serving cell (e.g. if the RSRP of the DL pathloss reference (i.e. SSB) is less than a configured threshold, UE selects SUL; otherwise NUL) on which RA is initiated. In case serving cell on which RA is initiated is configured with only NUL, UE selects NUL. So UE in RRC CONNECTED applies this procedure when both 2 step and 4 step RA are supported (i.e. dedicated RRC signaling received gNB includes both 2 step and 4 step RA configuration) for active UL BWP of selected UL carrier.

gNB signals a DL RSRP threshold for selecting 2/4 step RA procedure. In an embodiment, the DL RSRP threshold can be separately configured for NUL carrier and SUL carrier, and UE uses the DL RSRP threshold corresponding to UL carrier selected for RA. In another embodiment, the DL RSRP threshold can be included in RA configuration wherein the RA configuration is signaled per UL BWP and UE uses the DL RSRP threshold included in RA configuration corresponding to active UL BWP (note that in RRC IDLE/INACTIVE, initial UL BWP is the active UL BWP). In another embodiment, DL RSRP threshold can be cell specific, i.e. common for all BWPs, but separately configured for NUL and SUL. In another embodiment, DL RSRP threshold is common for all BWPs and UL carriers of a cell.

In an embodiment of the disclosure, UE measures the DL RSRP of serving cell on which RA is initiated (i.e. the cell on which UE will transmit Msg1 for 4 step RA and MsgA for 2 step RA). In an embodiment, the DL RSRP is the RSRP derived from SSB measurements of cell on which RA is initiated (i.e. the cell on which UE will transmit Msg1 for 4 step RA and MsgA for 2 step RA). In another embodiment, the DL RSRP is the RSRP of the DL pathloss reference. The DL pathloss reference can be synchronization signal, i.e. SSB. The DL pathloss reference can be SSB which is selected for selecting PRACH resource (preamble, PRACH occasion) and PUSCH resource for MsgA transmission. In another embodiment, the DL RSRP is the SS-RSRP of best SSB (i.e. highest RSRP value among the SS-RSRP value of all SSBs). In another embodiment, the DL RSRP is the DL RSRP of cell on which RA is initiated (i.e. the cell on which UE will transmit Msg1 for 4 step RA and MsgA for 2 step RA), and it is obtained as follows: maximum number (nrofSS-ResourcesToAverage) of beams (or SSBs) and a threshold (absThreshSS-Consolidation) are signaled by gNB. UE obtains them from SI or RRC signaling. If the highest SS-RSRP value among the SS-RSRP values of all SSBs (or beams) is below the threshold, DL RSRP of cell is the highest SS-RSRP value among the SS-RSRP values of all SSBs. Otherwise, DL RSRP of cell is the linear average of the SS-RSRP of up to the maximum number (nrofSS-ResourcesToAverage) of highest SS-RSRP values above the threshold. In an embodiment, DL RSRP of cell can be CSI-RSRP.

In another embodiment of the disclosure, if the DL RSRP of the serving cell on which RA is initiated (i.e. the cell on which the UE will transmit Msg1 for 4 step RA and MsgA for 2 step RA) measured by the UE is less than or equal to a threshold and TTI bundling for Msg3 transmission is supported, the UE performs the 4 step RA procedure as shown in FIG. 10. Threshold is signaled by the gNB (as described above).

Referring to FIG. 10, upon initiation of RA procedure at operation 1010, the UE checks if the DL RSRP of the cell on which RA is initiated (i.e. the cell on which the UE will transmit Msg1 for 4 step RA and MsgA for 2 step RA) is less than or equal to a threshold or not at operation 1020. In addition, the UE determines whether the TTI bundling for Msg3 transmission is supported at operation 1030. If yes, i.e. the DL RSRP of the serving cell on which RA is initiated (i.e. cell on which the UE will transmit Msg1 for 4 step RA and MsgA for 2 step RA) is less than or equal to the threshold and the TTI bundling for Msg3 transmission is supported, the UE performs the 4 step RA procedure at operation 1040. Otherwise (i.e. DL RSRP of serving cell on which RA is initiated is greater than a threshold) the UE performs the 2 step RA procedure at operation 1050. In an alternate embodiment, the UE can perform this selection between the 2 step and the 4 step based on the DL RSRP of the cell before each RA attempt of the RA procedure instead of at the beginning of the RA procedure. This is beneficial as channel conditions may change during the RA procedure.

In another embodiment of the disclosure, if the DL RSRP of the serving cell on which RA is initiated (i.e. the cell on which the UE will transmit Msg1 for 4 step RA and MsgA for 2 step RA) measured by the UE is less than a threshold and TTI bundling for Msg3 transmission is supported, the UE performs the 4 step RA procedure. Threshold is signaled by the gNB (as described above). Upon initiation of RA procedure, the UE checks if the DL RSRP of the cell on which RA is initiated (i.e. the cell on which the UE will transmit Msg1 for 4 step RA and MsgA for 2 step RA) is less than a threshold or not. In addition, the UE determines whether the TTI bundling for Msg3 transmission is supported. If yes, i.e. the DL RSRP of the serving cell on which RA is initiated (i.e. cell on which the UE will transmit Msg1 for 4 step RA and MsgA for 2 step RA) is less than the threshold and the TTI bundling for Msg3 transmission is supported, the UE performs the 4 step RA procedure. Otherwise (i.e. DL RSRP of serving cell on which RA is initiated is greater than or equal to a threshold) the UE performs the 2 step RA. In an alternate embodiment, the UE can perform this selection between the 2 step and the 4 step based on the DL RSRP of the cell before each RA attempt of the RA procedure instead of at the beginning of the RA procedure.

Figure 11:
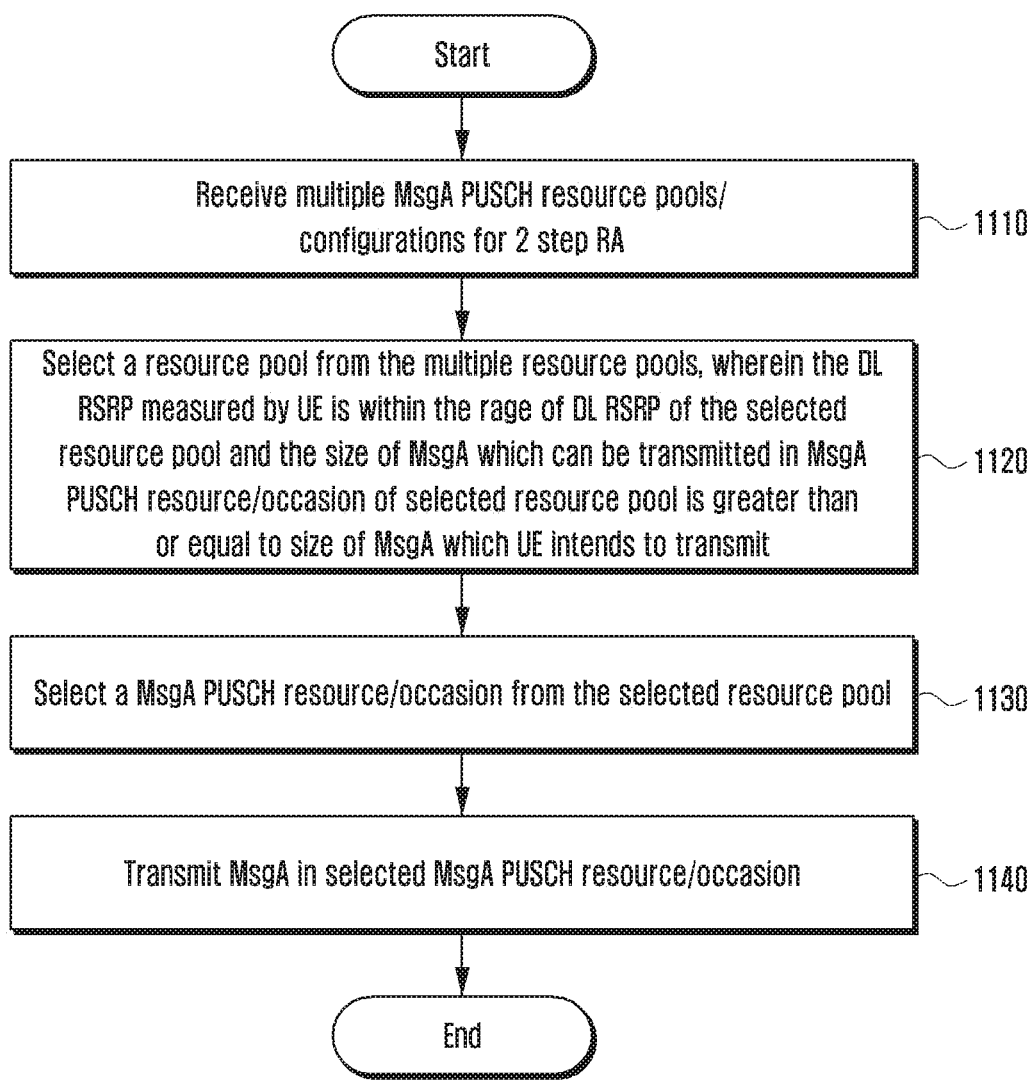
FIG. 11 illustrates a procedure performed by a UE to support reliable transmission of MsgA according to another embodiment of the disclosure.

FIG. 11 illustrates a procedure performed by a UE to support reliable transmission of MsgA according to another embodiment of the disclosure.

In an embodiment of the disclosure, UE measures the DL RSRP of serving cell on which RA is initiated (i.e. the cell on which UE will transmit Msg1 for 4 step RA and MsgA for 2 step RA). In an embodiment, the DL RSRP is the RSRP derived from SSB measurements of cell on which RA is initiated (i.e. the cell on which UE will transmit Msg1 for 4 step RA and MsgA for 2 step RA). In another embodiment, the DL RSRP is the RSRP of the DL pathloss reference. The DL pathloss reference can be synchronization signal, i.e. SSB. The DL pathloss reference can be SSB which is selected for selecting PRACH resource (preamble, PRACH occasion) and PUSCH resource for MsgA transmission. In another embodiment, the DL RSRP is the SS-RSRP of best SSB (i.e. highest RSRP value among the SS-RSRP value of all SSBs). In another embodiment, the DL RSRP is the DL RSRP of cell on which RA is initiated (i.e. the cell on which UE will transmit Msg1 for 4 step RA and MsgA for 2 step RA), and it is obtained as follows: maximum number (nrofSS-ResourcesToAverage) of beams (or SS Bs) and a threshold (absThreshSS-Consolidation) are signaled by gNB. UE obtains them from SI or RRC signaling. If the highest SS-RSRP value among the SS-RSRP values of all SSBs (or beams) is below the threshold, DL RSRP of cell is the highest SS-RSRP value among the SS-RSRP values of all SSBs. Otherwise, DL RSRP of cell is the linear average of the SS-RSRP of up to the maximum number (nrofSS-ResourcesToAverage) of highest SS-RSRP values above the threshold. In an embodiment, DL RSRP of cell can be CSI-RSRP.

Referring to FIG. 11, the UE receives multiple MsgA resource pools (or MsgA PUSCH resource pools)/configurations for the 2 step RA procedure at operation 1110. The range of the DL RSRP for which each MsgA resource pool (or MsgA PUSCH resource pool) can be used is signaled by the gNB. The MsgA payload size which can be transmitted in MsgA PUSCH occasion (or PUSCH resource) of resource pool is also indicated by the gNB. For MsgA payload transmission, the UE selects a resource pool from the multiple resource pools at operation 1120. The DL RSRP (i.e. the RSRP of RS used as the DL pathloss reference) of the serving cell on which RA is initiated (i.e. cell on which the UE will transmit MsgA for 2 step RA) measured by the UE is within the range of the DL RSRP of the selected resource pool. In addition, the size of MsgA payload (or the MAC PDU size or the size of information carried in MsgA) which can be transmitted in MsgA PUSCH resource of the selected resource pool is greater than or equal to the size of MsgA payload (or the MAC PDU size or the size of information carried in MsgA) which the UE intends to transmit. For example, four resource pools are configured. Resource pool 1 is used when DL RSRP<=threshold 1 and MsgA payload size<=X. Resource pool 2 is used when DL RSRP>threshold 1 and MsgA payload size<=X. Resource pool 3 is used when DL RSRP<=threshold 1 and MsgA payload size>X. Resource pool 4 is used when DL RSRP>threshold 1 and MsgA paylaod size>X. Each Msg1 PUSCH occasion (or PUSCH resource) in the selected resource pool is mapped to one or more SSBs. The UE selects a MsgA PUSCH occasion (or PUSCH resource) from the selected resource pool corresponding to a suitable SSB at operation 1130. An SSB is suitable if the SS block RSRP is greater than a threshold, where the threshold is signaled by the gNB. If no SSB is suitable, the UE can select MsgA PUSCH occasion (or PUSCH resource) from the selected resource pool corresponding to any SSB. If there are multiple MsgA PUSCH occasions (or PUSCH resources) corresponding to the selected SSB, the UE can select one MsgA PUSCH occasion randomly from multiple MsgA PUSCH occasions (or the PUSCH resources) corresponding to the selected SSB or the UE can select the earliest MsgA PUSCH occasion from multiple MsgA PUSCH occasions (or PUSCH resources) corresponding to the selected SSB. The UE then transmits MsgA payload in the selected MsgA PUSCH occasion (or PUSCH resource).

Figure 12:
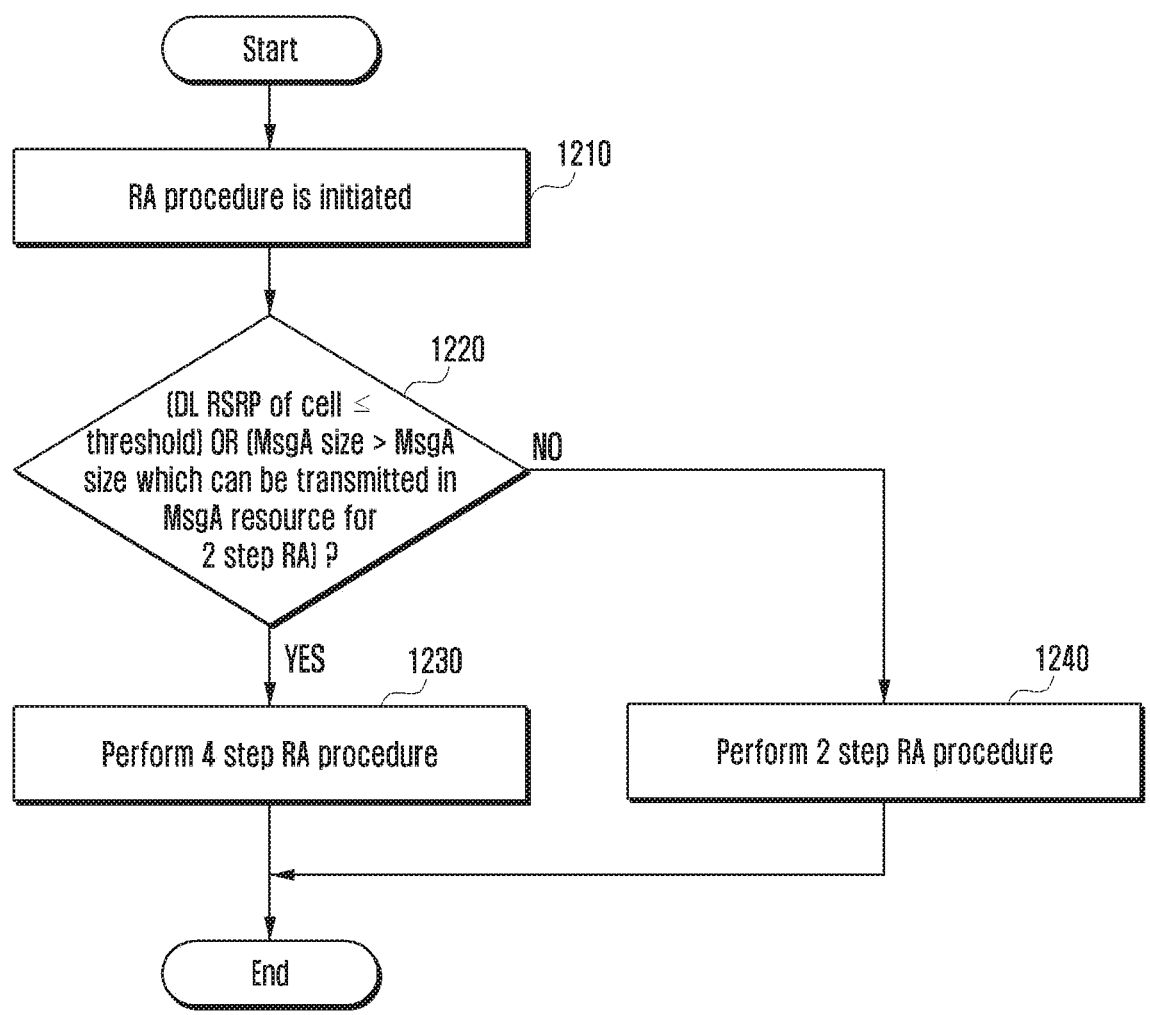
FIG. 12 illustrates a procedure performed by a UE to support reliable transmission of MsgA according to another embodiment of the disclosure.

FIG. 12 illustrates a procedure performed by a UE to support reliable transmission of MsgA according to another embodiment of the disclosure.

This procedure is applied when both 2 step and 4 step RA are supported in a cell on which RA is initiated and UE supports both 2 step and 4 step RA procedure. In a system supporting BWPs: in RRC IDLE/INACTIVE state, UE performs RA procedure over initial DL BWP and initial UL BWP of camped cell. In case camped cell is configured with both NUL and SUL, UE selects an UL carrier based on DL RSRP of camped cell (e.g. if the RSRP of the DL pathloss reference (i.e. SSB) is less than a configured threshold, UE selects SUL; otherwise NUL), and initial UL BWP for RA procedure is the initial UL BWP of selected UL carrier. In case camped cell is configured with only NUL, UE selects NUL, and initial UL BWP for RA procedure is the initial UL BWP of NUL. So UE in RRC IDLE/INACTIVE applies this procedure when both 2 step and 4 step RA are supported (i.e. SI received from camped cell includes both 2 step and 4 step RA configuration) in initial UL BWP of selected UL carrier. In RRC CONNECTED state, UE performs RA procedure over active DL BWP and active UL BWP of serving cell on which RA is initiated. In case serving cell on which RA is initiated is configured with both NUL and SUL, active UL BWP for RA procedure is the active UL BWP of selected UL carrier. UL carrier (NUL or SUL) to be used can be indicated by gNB, and if not indicated, UE selects an UL carrier based on DL RSRP of serving cell (e.g. if the RSRP of the DL pathloss reference (i.e. SSB) is less than a configured threshold, UE selects SUL; otherwise NUL) on which RA is initiated. In case serving cell on which RA is initiated is configured with only NUL, UE selects NUL. So UE in RRC CONNECTED applies this procedure when both 2 step and 4 step RA are supported (i.e. dedicated RRC signaling received gNB includes both 2 step and 4 step RA configuration) for active UL BWP of selected UL carrier.

gNB signals a DL RSRP threshold for selecting 2/4 step RA procedure. In an embodiment, the DL RSRP threshold can be separately configured for NUL carrier and SUL carrier, and UE uses the DL RSRP threshold corresponding to UL carrier selected for RA. In another embodiment, the DL RSRP threshold can be included in RA configuration wherein the RA configuration is signaled per UL BWP and UE uses the DL RSRP threshold included in RA configuration corresponding to active UL BWP (note that in RRC IDLE/INACTIVE, initial UL BWP is the active UL BWP). In another embodiment, DL RSRP threshold can be cell specific, i.e. common for all BWPs, but separately configured for NUL and SUL. In another embodiment, DL RSRP threshold is common for all BWPs and UL carriers of a cell.

In an embodiment of the disclosure, UE measures the DL RSRP of serving cell on which RA is initiated (i.e. the cell on which UE will transmit Msg1 for 4 step RA and MsgA for 2 step RA). In an embodiment, the DL RSRP is the RSRP derived from SSB measurements of cell on which RA is initiated (i.e. the cell on which UE will transmit Msg1 for 4 step RA and MsgA for 2 step RA). In another embodiment, the DL RSRP is the RSRP of the DL pathloss reference. The DL pathloss reference can be synchronization signal, i.e. SSB. The DL pathloss reference can be SSB which is selected for selecting PRACH resource (preamble, PRACH occasion) and PUSCH resource for MsgA transmission. In another embodiment, the DL RSRP is the SS-RSRP of best SSB (i.e. highest RSRP value among the SS-RSRP value of all SSBs). In another embodiment, the DL RSRP is the DL RSRP of cell on which RA is initiated (i.e. the cell on which UE will transmit Msg1 for 4 step RA and MsgA for 2 step RA), and it is obtained as follows: maximum number (nrofSS-ResourcesToAverage) of beams (or SSBs) and a threshold (absThreshSS-Consolidation) are signaled by gNB. UE obtains them from SI or RRC signaling. If the highest SS-RSRP value among the SS-RSRP values of all SSBs (or beams) is below the threshold, DL RSRP of cell is the highest SS-RSRP value among the SS-RSRP values of all SSBs. Otherwise, DL RSRP of cell is the linear average of the SS-RSRP of up to the maximum number (nrofSS-ResourcesToAverage) of highest SS-RSRP values above the threshold. In an embodiment, DL RSRP of cell can be CSI-RSRP.

Referring to FIG. 12, upon initiation of the RA procedure at operation 1210, the UE determines whether the DL RSRP of the cell on which RA is initiated (i.e. cell on which the UE will transmit Msg1 for 4 step RA and MsgA for 2 step RA) measured by the UE is less than or equal to a threshold and/or whether MsgA payload size (or the MAC PDU size or the size of information carried in MsgA) for the 2 step RA is greater than MsgA payload size (or the MAC PDU size or the size of information carried in MsgA) that can be transmitted in MsgA PUSCH resource for the 2 step RA at operation 1220. If the DL RSRP of the cell on which RA is initiated (i.e. cell on which the UE will transmit Msg1 for 4 step RA and MsgA for 2 step RA) measured by the UE is less than or equal to a threshold or if the MsgA payload size (or the MAC PDU size or size of information carried in MsgA) for the 2 step RA is greater than the MsgA payload size (or the MAC PDU size or the size of information carried in MsgA) that can be transmitted in MsgA PUSCH resource for the 2 step RA, the UE performs the 4 step RA procedure at operation 1230, as shown in FIG. 12. Otherwise, the UE performs the 2 step RA procedure at operation 1240. The threshold is signaled by the gNB (as described above).

Figure 13:
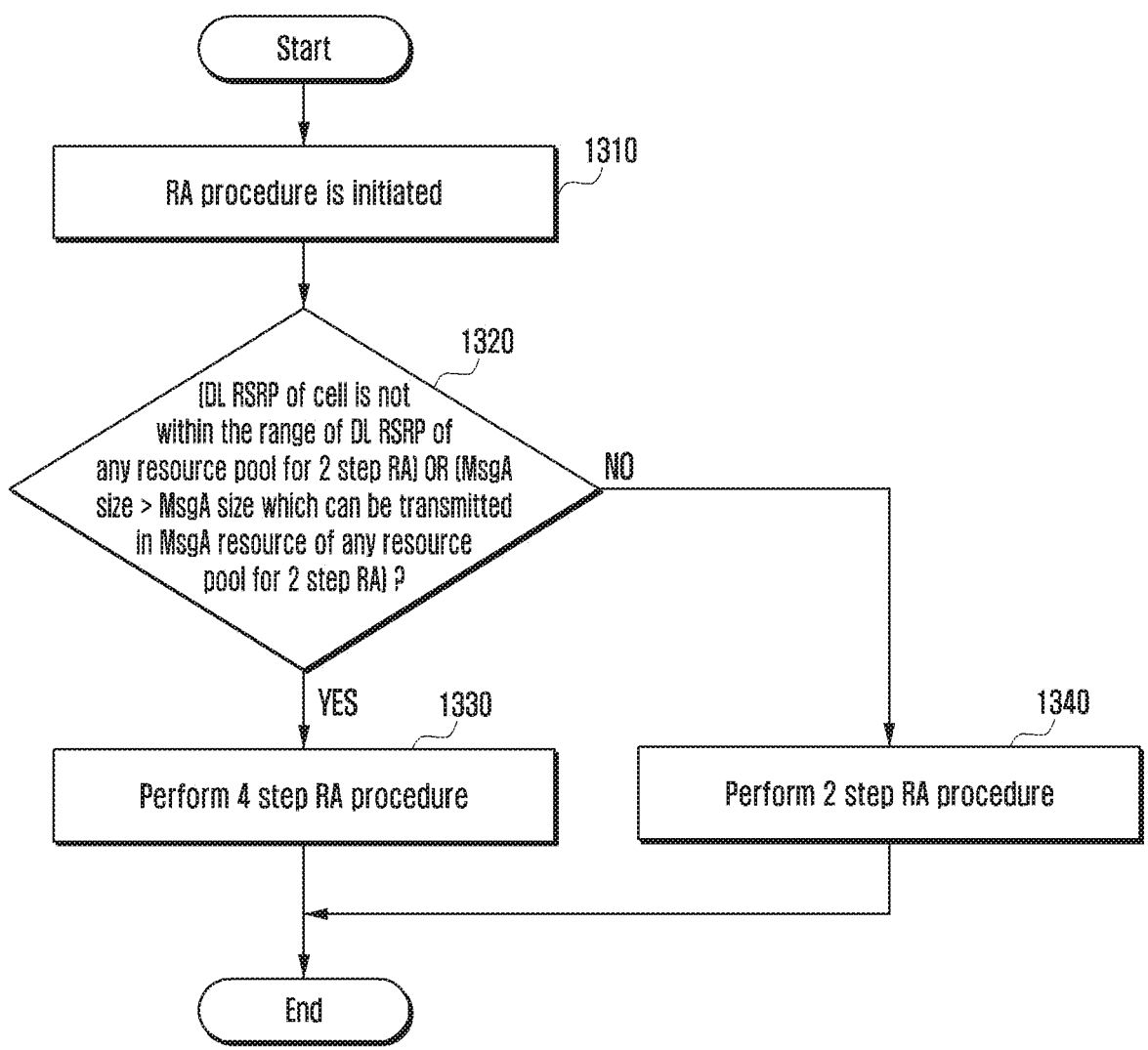
FIG. 13 illustrates a procedure performed by a UE to support reliable transmission of MsgA according to another embodiment of the disclosure.

FIG. 13 illustrates a procedure performed by a UE to support reliable transmission of MsgA according to another embodiment of the disclosure.

This procedure is applied when both 2 step and 4 step RA are supported in a cell on which RA is initiated and UE supports both 2 step and 4 step RA procedure. In a system supporting BWPs: in RRC IDLE/INACTIVE state, UE performs RA procedure over initial DL BWP and initial UL BWP of camped cell. In case camped cell is configured with both NUL and SUL, UE selects an UL carrier based on DL RSRP of camped cell (e.g. if the RSRP of the DL pathloss reference (i.e. SSB) is less than a configured threshold, UE selects SUL; otherwise NUL), and initial UL BWP for RA procedure is the initial UL BWP of selected UL carrier. In case camped cell is configured with only NUL, UE selects NUL, and initial UL BWP for RA procedure is the initial UL BWP of NUL. So UE in RRC IDLE/INACTIVE applies this procedure when both 2 step and 4 step RA are supported (i.e. SI received from camped cell includes both 2 step and 4 step RA configuration) in initial UL BWP of selected UL carrier. In RRC CONNECTED state, UE performs RA procedure over active DL BWP and active UL BWP of serving cell on which RA is initiated. In case serving cell on which RA is initiated is configured with both NUL and SUL, active UL BWP for RA procedure is the active UL BWP of selected UL carrier. UL carrier (NUL or SUL) to be used can be indicated by gNB, and if not indicated, UE selects an UL carrier based on DL RSRP of serving cell (e.g. if the RSRP of the DL pathloss reference (i.e. SSB) is less than a configured threshold, UE selects SUL; otherwise NUL) on which RA is initiated. In case serving cell on which RA is initiated is configured with only NUL, UE selects NUL. So UE in RRC CONNECTED applies this procedure when both 2 step and 4 step RA are supported (i.e. dedicated RRC signaling received gNB includes both 2 step and 4 step RA configuration) for active UL BWP of selected UL carrier.

gNB signals a DL RSRP threshold for selecting 2/4 step RA procedure. In an embodiment, the DL RSRP threshold can be separately configured for NUL carrier and SUL carrier, and UE uses the DL RSRP threshold corresponding to UL carrier selected for RA. In another embodiment, the DL RSRP threshold can be included in RA configuration wherein the RA configuration is signaled per UL BWP and UE uses the DL RSRP threshold included in RA configuration corresponding to active UL BWP (note that in RRC IDLE/INACTIVE, initial UL BWP is the active UL BWP). In another embodiment, DL RSRP threshold can be cell specific, i.e. common for all BWPs, but separately configured for NUL and SUL. In another embodiment, DL RSRP threshold is common for all BWPs and UL carriers of a cell.

In an embodiment of the disclosure, UE measures the DL RSRP of serving cell on which RA is initiated (i.e. the cell on which UE will transmit Msg1 for 4 step RA and MsgA for 2 step RA). In an embodiment, the DL RSRP is the RSRP derived from SSB measurements of cell on which RA is initiated (i.e. the cell on which UE will transmit Msg1 for 4 step RA and MsgA for 2 step RA). In another embodiment, the DL RSRP is the RSRP of the DL pathloss reference. The DL pathloss reference can be synchronization signal, i.e. SSB. The DL pathloss reference can be SSB which is selected for selecting PRACH resource (preamble, PRACH occasion) and PUSCH resource for MsgA transmission. In another embodiment, the DL RSRP is the SS-RSRP of best SSB (i.e. highest RSRP value among the SS-RSRP value of all SSBs). In another embodiment, the DL RSRP is the DL RSRP of cell on which RA is initiated (i.e. the cell on which UE will transmit Msg1 for 4 step RA and MsgA for 2 step RA), and it is obtained as follows: maximum number (nrofSS-ResourcesToAverage) of beams (or SSBs) and a threshold (absThreshSS-Consolidation) are signaled by gNB. UE obtains them from SI or RRC signaling. If the highest SS-RSRP value among the SS-RSRP values of all SSBs (or beams) is below the threshold, DL RSRP of cell is the highest SS-RSRP value among the SS-RSRP values of all SSBs. Otherwise, DL RSRP of cell is the linear average of the SS-RSRP of up to the maximum number (nrofSS-ResourcesToAverage) of highest SS-RSRP values above the threshold. In an embodiment, DL RSRP of cell can be CSI-RSRP.

Referring to FIG. 13, upon initiation of the RA procedure at operation 1310, the UE determines whether the DL RSRP of the cell on which RA is initiated (i.e. cell on which the UE will transmit Msg1 for 4 step RA and MsgA for 2 step RA) measured by the UE is within the range of the DL RSRP of any resource pool for the 2 step RA and/or whether the MsgA payload size (or the MAC PDU size or size of information carried in MsgA) for the 2 step RA is greater than the MsgA payload size (or the MAC PDU size or the size of information carried in MsgA) that can be transmitted in MsgA PUSCH resource for the 2 step RA at operation 1320. If the DL RSRP of the cell on which RA is initiated (on which the UE will transmit Msg1 for 4 step RA and MsgA for 2 step RA) measured by the UE is not within the range of the DL RSRP of any resource pool for the 2 step RA or if the MsgA payload size (or the MAC PDU size or the size of information carried in MsgA) for the 2 step RA is greater than the MsgA payload size (or the MAC PDU size or the size of information carried in MsgA) that can be transmitted in the MsgA PUSCH resource for the 2 step RA, the UE performs the 4 step RA procedure at operation 1330, as shown in FIG. 13. Otherwise, the UE performs the 2 step RA procedure at operation 1340.

Figure 14:
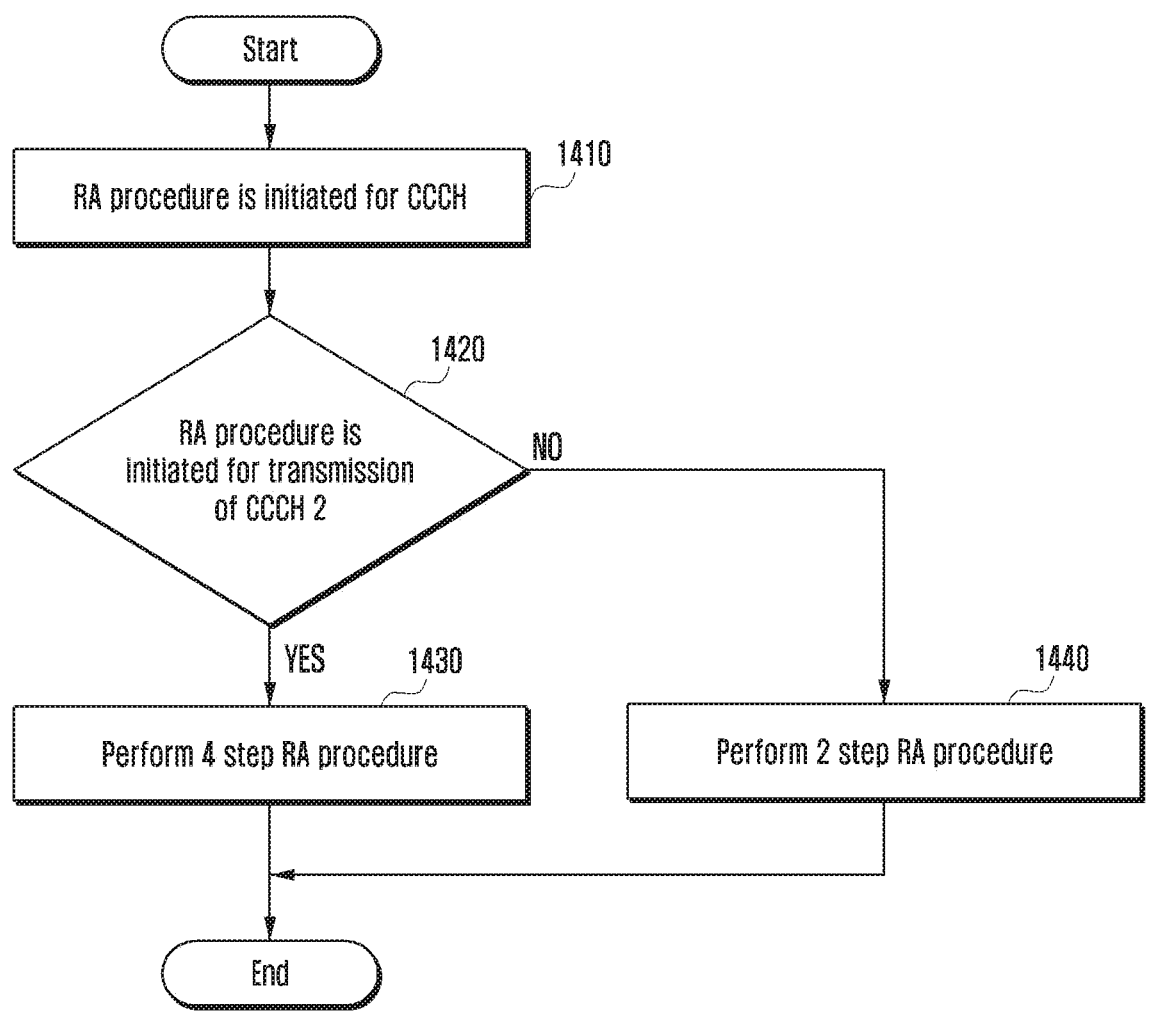
FIG. 14 illustrates a procedure performed by a UE to support reliable transmission of MsgA according to another embodiment of the disclosure.

FIG. 14 illustrates a procedure performed by a UE to support reliable transmission of MsgA according to another embodiment of the disclosure.

Referring to FIG. 14, upon initiation of the RA procedure at operation 1410, the UE determines whether the RA procedure is initiated for a CCCH transmission and whether the CCCH is CCCH 2 at operation 1420. If the RA procedure is initiated for transmission of CCCH 2, then the UE performs the 4 step RA procedure at operation 1430. Otherwise, e.g. if the CCCH is CCCH1, the UE performs the 2 step RA at operation 1440, as shown in FIG. 14.

Figure 15A:
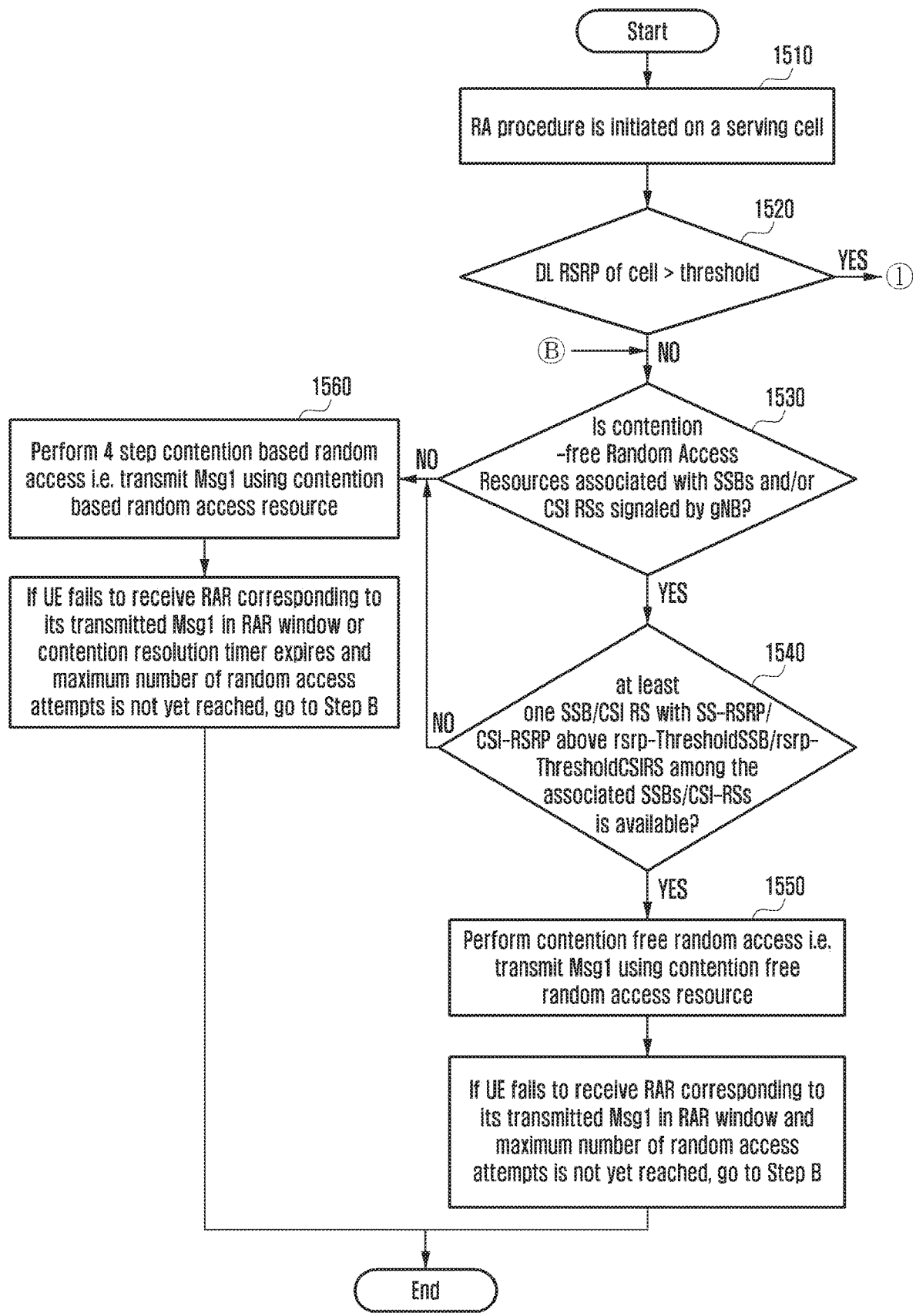
FIGS. 15A and 15B illustrate a procedure performed by a UE to support reliable transmission of MsgA according to another embodiment of the disclosure.
Figure 15B:
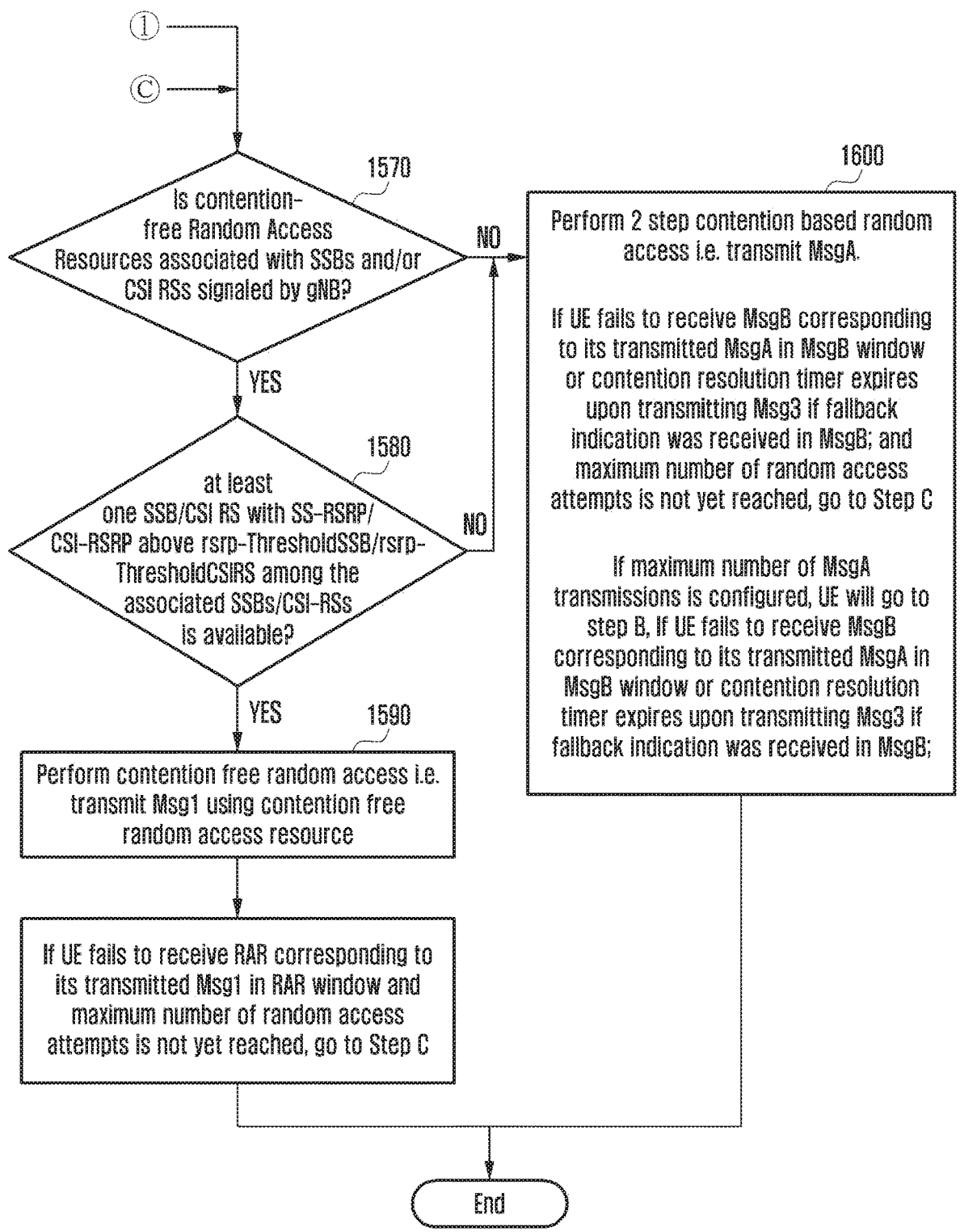

FIGS. 15A and 15B illustrate a procedure performed by a UE to support reliable transmission of MsgA according to another embodiment of the disclosure.

This procedure is applied when both 2 step and 4 step RA are supported in a cell on which RA is initiated and UE supports both 2 step and 4 step RA procedure. In a system supporting BWPs: in RRC IDLE/INACTIVE state, UE performs RA procedure over initial DL BWP and initial UL BWP of camped cell. In case camped cell is configured with both NUL and SUL, UE selects an UL carrier based on DL RSRP of camped cell (e.g. if the RSRP of the DL pathloss reference (i.e. SSB) is less than a configured threshold, UE selects SUL; otherwise NUL), and initial UL BWP for RA procedure is the initial UL BWP of selected UL carrier. In case camped cell is configured with only NUL, UE selects NUL, and initial UL BWP for RA procedure is the initial UL BWP of NUL. So UE in RRC IDLE/INACTIVE applies this procedure when both 2 step and 4 step RA are supported (i.e. SI received from camped cell includes both 2 step and 4 step RA configuration) in initial UL BWP of selected UL carrier. In RRC CONNECTED state, UE performs RA procedure over active DL BWP and active UL BWP of serving cell on which RA is initiated. In case serving cell on which RA is initiated is configured with both NUL and SUL, active UL BWP for RA procedure is the active UL BWP of selected UL carrier. UL carrier (NUL or SUL) to be used can be indicated by gNB, and if not indicated, UE selects an UL carrier based on DL RSRP of serving cell (e.g. if the RSRP of the DL pathloss reference (i.e. SSB) is less than a configured threshold, UE selects SUL; otherwise NUL) on which RA is initiated. In case serving cell on which RA is initiated is configured with only NUL, UE selects NUL. So UE in RRC CONNECTED applies this procedure when both 2 step and 4 step RA are supported (i.e. dedicated RRC signaling received gNB includes both 2 step and 4 step RA configuration) for active UL BWP of selected UL carrier.

gNB signals a DL RSRP threshold for selecting 2/4 step RA procedure. In an embodiment, the DL RSRP threshold can be separately configured for NUL carrier and SUL carrier, and UE uses the DL RSRP threshold corresponding to UL carrier selected for RA. In another embodiment, the DL RSRP threshold can be included in RA configuration wherein the RA configuration is signaled per UL BWP and UE uses the DL RSRP threshold included in RA configuration corresponding to active UL BWP (note that in RRC IDLE/INACTIVE, initial UL BWP is the active UL BWP). In another embodiment, DL RSRP threshold can be cell specific, i.e. common for all BWPs, but separately configured for NUL and SUL. In another embodiment, DL RSRP threshold is common for all BWPs and UL carriers of a cell.

In an embodiment of the disclosure, UE measures the DL RSRP of serving cell on which RA is initiated (i.e. the cell on which UE will transmit Msg1 for 4 step RA and MsgA for 2 step RA). In an embodiment, the DL RSRP is the RSRP derived from SSB measurements of cell on which RA is initiated (i.e. the cell on which UE will transmit Msg1 for 4 step RA and MsgA for 2 step RA). In another embodiment, the DL RSRP is the RSRP of the DL pathloss reference. The DL pathloss reference can be synchronization signal, i.e. SSB. The DL pathloss reference can be SSB which is selected for selecting PRACH resource (preamble, PRACH occasion). In another embodiment, the DL RSRP is the SS-RSRP of best SSB (i.e. highest RSRP value among the SS-RSRP value of all SSBs). In another embodiment, the DL RSRP is the DL RSRP of cell on which RA is initiated, and it is obtained as follows: maximum number (nrofSS-ResourcesToAverage) of beams (or SSBs) and a threshold (absThreshSS-Consolidation) are signaled by gNB. UE obtains them from SI or RRC signaling. If the highest SS-RSRP value among the SS-RSRP values of all SSBs (or beams) is below the threshold, DL RSRP of cell is the highest SS-RSRP value among the SS-RSRP values of all SSBs. Otherwise, DL RSRP of cell is the linear average of the SS-RSRP of up to the maximum number (nrofSS-ResourcesToAverage) of highest SS-RSRP values above the threshold. In an embodiment, DL RSRP of cell can be CSI-RSRP.

Referring to FIG. 15A, upon initiation of RA procedure at operation 1510, the UE checks if the DL RSRP of the serving cell (i.e. the cell on which the UE will transmit Msg1 for 4 step RA and MsgA for 2 step RA) is greater than DL RSRP threshold or not at operation 1520.

In an embodiment of the disclosure, if DL RSRP of serving cell on which RA is initiated (i.e. the cell on which UE will transmit Msg1 for 4 step RA and MsgA for 2 step RA) measured by UE is less than or equal to DL RSRP threshold at operation 1520, UE performs the following:

UE determines if contention-free RA (CFRA) resources associated with SSBs and/or CSI reference signals (CSI-RS)s is signaled by gNB or not at operation 1530. If determination is yes at operation 1530, UE determines if at least one SSB/CSI-RS with SS-RSRP/CSI-RSRP above rsrp-ThresholdSSB/rsrp-ThresholdCSIRS among the associated SSBs/CSI-RSs is available at operation 1540. If determination is yes at operation 1540, UE performs CFRA, i.e. transmits Msg1 using CFRA resource at operation 1550. If UE fails to receive RAR corresponding to its transmitted Msg1 in RAR window and maximum number of RA attempts is not yet reached, UE performs operation 1530.

If the determination is no at operation 1530 or at operation 1540, UE performs 4 step CBRA, i.e. transmits Msg1 using CBRA resource at operation 1560. If UE fails to receive RAR corresponding to its transmitted Msg1 in RAR window or contention resolution timer expires, and maximum number of RA attempts is not yet reached, UE performs operation 1530.

In an embodiment of the disclosure, if DL RSRP of serving cell on which RA is initiated (i.e. the cell on which UE will transmit Msg1 for 4 step RA and MsgA for 2 step RA) measured by UE is greater than DL RSRP threshold at operation 1520, UE performs the following:

Referring to FIG. 15B, UE determines if CFRA resources associated with SSBs and/or CSI-RS s is signaled by gNB or not at operation 1570. If determination is yes at operation 1570, UE determines if at least one SSB/CSI-RS with SS-RSRP/CSI-RSRP above rsrp-ThresholdSSB/rsrp-ThresholdCSIRS among the associated SSBs/CSI-RSs is available at operation 1580. If determination is yes at operation 1580, UE performs CFRA, i.e. transmits Msg1 using CFRA resource at operation 1590. If UE fails to receive RAR corresponding to its transmitted Msg1 in RAR window and maximum number of RA attempts is not yet reached, UE performs operation 1570.

If the determination is no at operation 1570 or at operation 1580, UE performs 2 step CBRA, i.e. transmits MsgA using CBRA resource at operation 1600. If UE fails to receive MsgB corresponding to its transmitted MsgA in MsgB window or contention resolution timer expires upon transmitting Msg3 if fallback indication was received in MsgB; and maximum number of RA attempts is not yet reached, UE performs operation 1570.

If maximum number of MsgA transmissions is configured, UE will perform operation 1530, if UE fails to receive MsgB corresponding to its transmitted MsgA in MsgB window or contention resolution timer expires upon transmitting Msg3 if fallback indication was received in MsgB.

Figure 16A:
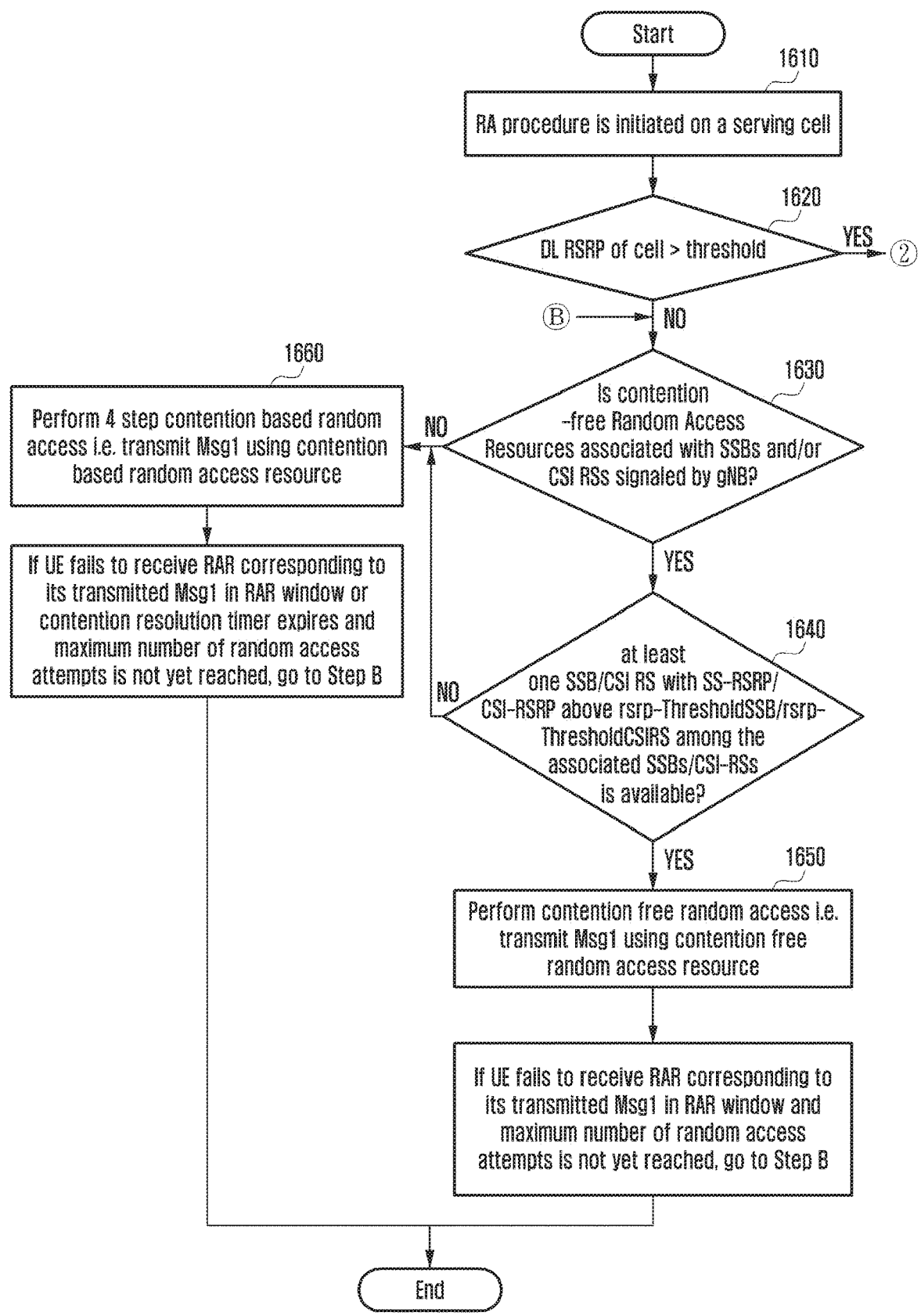
FIGS. 16A and 16B are a flowchart that illustrates UE operations for performing an RA procedure according to an alternate embodiment of disclosure.
Figure 16B:
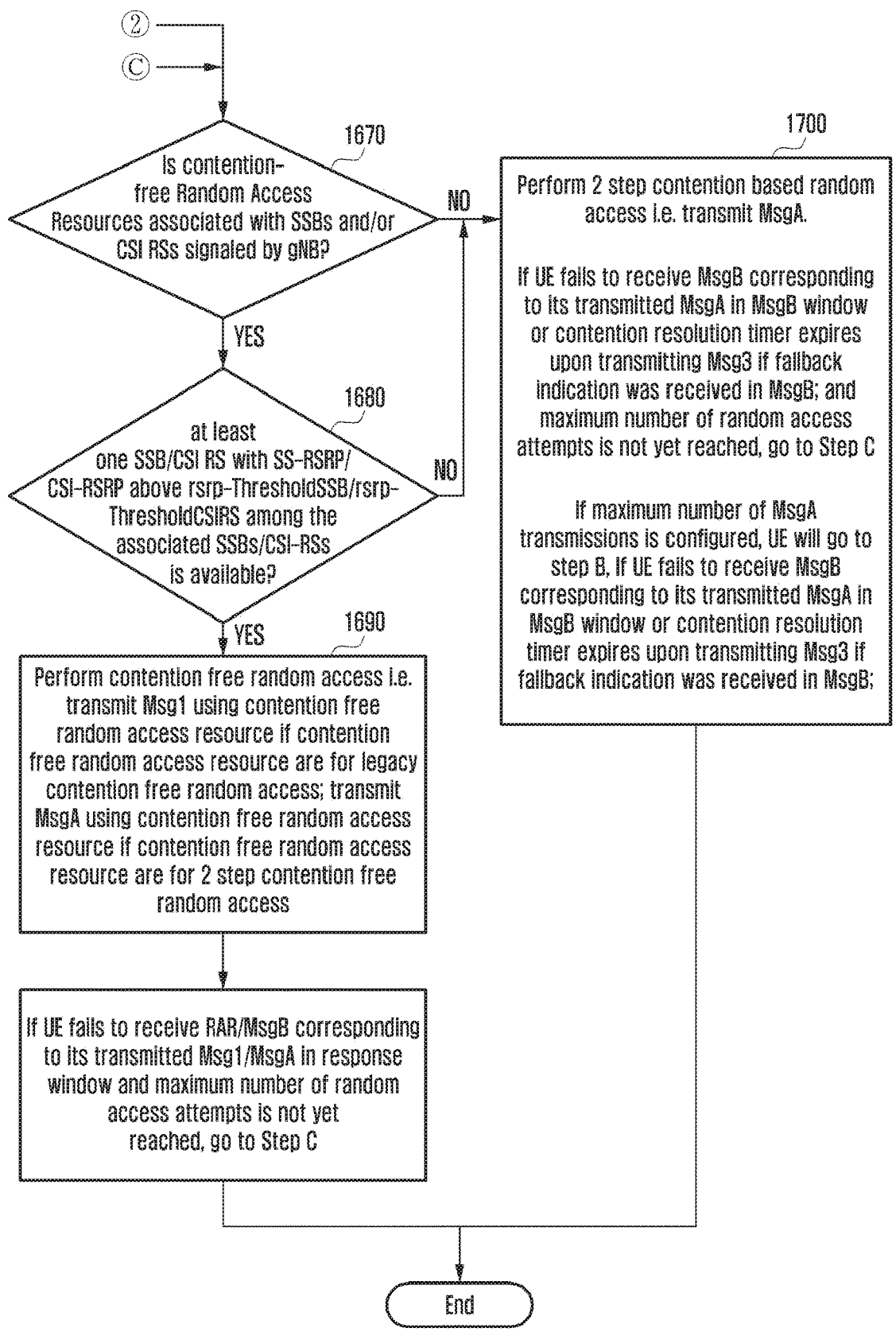

FIGS. 16A and 16B are a flowchart that illustrates UE operations for performing an RA procedure according to an alternate embodiment of disclosure.

Referring to FIG. 16A, upon initiation of RA procedure at operation 1610, the UE checks if the DL RSRP of the serving cell (i.e. the cell on which the UE will transmit Msg1 for 4 step RA and MsgA for 2 step RA) is greater than DL RSRP threshold or not at operation 1620.

In an embodiment of the disclosure, if DL RSRP of serving cell on which RA is initiated (i.e. the cell on which UE will transmit Msg1 for 4 step RA and MsgA for 2 step RA) measured by UE is less than or equal to DL RSRP threshold at operation 1620, UE performs the following:

UE determine if CFRA resources associated with SSBs and/or CSI-RSs is signaled by gNB or not at operation 1630. If determination is yes at operation 1630, UE determines if at least one SSB/CSI-RS with SS-RSRP/CSI-RSRP above rsrp-ThresholdSSB/rsrp-ThresholdCSIRS among the associated SSBs/CSI-RSs is available at operation 1640. If determination is yes at operation 1640, UE performs CFRA, i.e. transmits Msg1 using CFRA resource at operation 1650. If UE fails to receive RAR corresponding to its transmitted Msg1 in RAR window and maximum number of RA attempts is not yet reached, UE performs operation 1630.

If determination is no at operation 1630 or at operation 1640, UE performs 4 step CBRA, i.e. transmits Msg1 using CBRA resource at operation 1660, if UE fails to receive RAR corresponding to its transmitted Msg1 in RAR window or contention resolution timer expires, and maximum number of RA attempts is not yet reached, UE performs operation 1630.

In an embodiment of the disclosure, if DL RSRP of serving cell on which RA is initiated (i.e. the cell on which UE will transmit Msg1 for 4 step RA and MsgA for 2 step RA) measured by UE is greater than DL RSRP threshold at operation 1620, UE performs the following:

Referring to FIG. 16B, UE determines if CFRA resources associated with SSBs and/or CSI-RSs is signaled by gNB or not at operation 1670. If determination is yes at operation 1670, UE determines if at least one SSB/CSI-RS with SS-RSRP/CSI-RSRP above rsrp-ThresholdSSB/rsrp-ThresholdCSIRS among the associated SSBs/CSI-RSs is available at operation 1680. If determination is yes at operation 1680, UE performs CFRA, i.e. transmits Msg1 using CFRA resource if CFRA resources are for legacy CFRA, or transmits MsgA using CFRA resource if CFRA resources are for 2 step CFRA at operation 1690. If UE fails to receive RAR/MsgB corresponding to its transmitted Msg1/MsgA in response window and maximum number of RA attempts is not yet reached, UE performs operation 1670.

If the determination is no at operation 1670 or at operation 1680, UE performs 2 step CBRA, i.e. transmits MsgA at operation 1700. If UE fails to receive MsgB corresponding to its transmitted MsgA in MsgB window or contention resolution timer expires upon transmitting Msg3 if fallback indication was received in MsgB; and maximum number of RA attempts is not yet reached, UE performs operation 1670.

If maximum number of MsgA transmissions is configured, UE will perform operation 1630, if UE fails to receive MsgB corresponding to its transmitted MsgA in MsgB window or contention resolution timer expires upon transmitting Msg3 if fallback indication was received in MsgB.

3. Method to Handle RA-RNTI Ambiguity Between 2 Step and 4 Step RA Procedure There can be ambiguity in determining whether the network response transmitted by the gNB is for the 2 step or the 4 step RA. For example, the UE1 transmits Msg1 for the 4 step RA. The UE2 transmits MsgA for the 2 step RA. For network response (i.e. Msg2 for 4 step RA procedure and MsgB for 2 step RA procedure), UE monitors PDCCH addressed to RA-RNTI where RA-RNTI is determined as follows: RA-RNTI=1+$s\_id$+14*$t\_id$+14*80*$f\_id$+14*80*8*$ul\_carrier\_id$. $s\_id$, $t\_id$, $f\_id$ and $ul\_carrier\_id$ corresponding to a MsgA occasion for the 2 step RA and a Msg1 occasion for the 4 step RA can be same. So a method is needed to avoid this ambiguity.

In an embodiment, an additional parameter 'RACH_Type' is added in RA-RNTI calculation. The RA-RNTI is derived as follows:

RA-RNTI=1+$s\_id$+14*$t\_id$+14*80*$f\_id$+14*80*8*$ul\_carrier\_id$+14*80*8*2*RACH_Type, Where RACH Type=0 for legacy RACH procedure; RACH Type=1 for the new 2 step RACH procedure, $s\_id$ is the index of the first OFDM symbol of the specified PRACH or Msg1 occasion (0≤$s\_id$<14), MsgA occasion can be PRACH occasion or PUSCH occasion, $t\_id$ is the index of the first slot of the specified PRACH or Msg1 occasion (0≤$t\_id$<80), MsgA occasion can be PRACH occasion or PUSCH occasion, $f\_id$ is the index of the specified PRACH or MsgA occasion within the slot in the frequency domain, MsgA occasion can be PRACH occasion or PUSCH occasion, and $ul\_carrier\_id$ is the UL carrier used for transmission (0 for NUL and 1 for SUL).

For the legacy RA procedure, for RA response (RAR), UE monitors PDCCH addressed to RA-RNTI=1+$s\_id$+14*$t\_id$+14*80*$f\_id$+14*80*8*$ul\_carrier\_id$. For a new 2 step RA procedure, for MsgB, UE monitors PDCCH addressed to RA-RNTI=1+$s\_id$+14*$t\_id$+14*80*$f\_id$+14*80*8*$ul\_carrier\_id$+14*80*8*2*RACH Type.

In another embodiment, a separate control resource set (CORESET) or a search space for the new 2 step RA procedure and the legacy 4 step RA are signaled. For the legacy RA procedure, for RAR, UE monitors PDCCH in RAR CORESET/search space (say X, X is ID of search space, a list of search spaces are configured wherein each have a unique ID). For the new 2 step RA procedure, for MsgB, UE monitors PDCCH in MsgB CORESET/search space (say Y, Y is id of search space, a list of search spaces are configured wherein each have a unique ID). The RAR CORESET/search space for the legacy RA and MsgB CORESET/search space for the new 2 step RA are signaled by the gNB. In an embodiment, configuration of MsgB CORESET/search space for new 2 step RA is optionally signaled by gNB. For example, gNB may not signal this if RACH occasions for 2 step and legacy RA procedure are shared. If MsgB CORESET/search space is not signaled, for MsgB, UE monitors PDCCH in RAR CORESET/search space.

In another embodiment, a fixed RNTI value is used, instead of the RA-RNTI, to address the PDCCH for MsgB of the new 2 step RA. If the UE selects the Msg1 resource from the resource pool or the RACH configuration for the legacy RA procedure, in other words for legacy RA procedure, for RAR, UE monitors PDCCH addressed to RA-RNTI=1+$s\_id$+14*$t\_id$+14*80*$f\_id$+14*80*8*$ul\_carrier\_id$. If the UE selects the MsgA resource from the resource pool or the RACH configuration for the new 2 step RA procedure, in other words for 2 step RA procedure, for MsgB, UE monitors PDCCH addressed to RA-RNTI=fixed RNTI value. The fixed RNTI value can be reserved and pre-defined in specifications.

In another embodiment, the RACH or the Msg1 occasions for the legacy RA procedure are not configured in a BWP in which the RACH or the MsgA occasions for the new 2 step RA are configured. For example, the RACH or the Msg1 occasions for the legacy RA procedure are configured by the gNB in a BWP X then the RACH or the MsgA occasions for the new 2 step RA procedure are configured by the gNB in a BWP Y where Y is not equal to X. The DL BWP used for receiving network response (Msg2/MsgB) has the same BWP ID as the UL BWP ID in which Msg1/MsgA is transmitted. So this approach will ensure that the DL BWPs used for Msg2 for the legacy RA procedure and MsgB for the new 2 step RA procedure are different.

In another embodiment, the gNB can configure non overlapping (i.e. all of $t\_id$, $f\_id$ and $s\_id$ of a PRACH occasion of new 2 step RA and PRACH occasion of the legacy RA are not same) the RACH occasions for the new 2 step RA and the legacy RA procedure. This will ensure that the RA-RNTI determined for the new 2 step RA and the legacy RA procedure will be different.

In another embodiment, an additional parameter 'RA preamble ID (RAPID)' is added in RA-RNTI calculation. The RA-RNTI is derived as follows:

RA-RNTI=1+$s\_id$+14*$t\_id$+14*80*$f\_id$+14*80*8*$ul\_carrier\_id$+14*80*8*2*RAPID, Where RAPID=RAPID of RACH preamble transmitted in MsgA, $s\_id$ is the index of the first OFDM symbol of the specified PRACH or Msg1 occasion (0≤$s\_id$<14), $t\_id$ is the index of the first slot of the specified PRACH or Msg1 occasion (0≤$t\_id$<80), f_id is the index of the specified PRACH within the slot in the frequency domain, and ul_carrier_id is the UL carrier used for Msg1 transmission (0 for NUL and 1 for SUL).

If the UE selects a Msg1 resource from resource pool or the RACH configuration for the legacy RA procedure, i.e. for RAR, UE monitors PDCCH addressed to RA-RNTI=1+s_id+14*t_id+14*80*f_id+14*80*8*ul_carrier_id. If the UE selects the MsgA resource from resource pool or RACH configuration for the new 2 step RA procedure, in other words for 2 step RA procedure, i.e. for MsgB, UE monitors PDCCH addressed to RA-RNTI=1+s_id+14*t_id+14*80*f_id+14*80*8*ul_carrier_id+14*80*8*2*RAPID. This will ensure that the RA-RNTI determined for the new 2 step RA and the legacy RA procedure will be different.

In another embodiment, an additional parameter 'f_id offset' is added in RA-RNTI calculation. The RA-RNTI is derived as follows:

RA-RNTI=1+s_id+14*t_id+14*80*(f_id+f_id offset)+14*80*8*ul_carrier_id+14*80*8*2*RAPID, Where RAPID=RAPID of RACH preamble transmitted in MsgA, s_id is the index of the first OFDM symbol of the specified PRACH or Msg1 occasion (0≤s_id<14), t_id is the index of the first slot of the specified PRACH or Msg1 occasion (0≤t_id<80), f_id is the index of the specified PRACH within the slot in the frequency domain, ul_carrier_id is the UL carrier used for Msg1 transmission (0 for NUL and 1 for SUL), and f_id offset is signaled for the new 2 step RA by the gNB. If not signaled, f_id offset is zero.

If the UE selects the Msg1 resource from the resource pool or the RACH configuration for legacy RA procedure, i.e. for RAR, UE monitors PDCCH addressed to RA-RNTI=1+s_id+14*t_id+14*80*f_id+14*80*8*ul_carrier_id. If the UE selects the MsgA resource from the resource pool or the RACH configuration for the new 2 step RA procedure, in other words for 2 step RA procedure, i.e. for MsgB, UE monitors PDCCH addressed to RA-RNTI=1+s_id+14*t_id+14*80*(f_id+f_id offset)+14*80*8*ul_carrier_id. This will ensure that the RA-RNTI determined for the new 2 step RA and the legacy RA procedure will be different.

In another embodiment, the gNB signals a parameter 'f_id start offset'. The frequency division multiplexed PRACH occasions for 2 step RA are numbered sequentially starting from 'f_id start offset'. The frequency division multiplexed PRACH occasions for 2 step RA are numbered sequentially starting from 0 if 'f_id start offset' is not signaled.

In another embodiment, ul_carrier_id can be set to 2 (if NUL is used for MsgA transmission) and 3 (if SUL is used for MsgA transmission) in RA-RNTI calculation for the new 2 step RA. If the UE selects Msg1 resource from resource pool or RACH configuration for legacy RA procedure, i.e. for RAR, UE monitors PDCCH addressed to RA-RNTI=1+s_id+14*t_id+14*80*f_id+14*80*8*ul_carrier_id.

s_id is the index of the first OFDM symbol of the specified PRACH or Msg1 occasion (0≤s_id<14), t_id is the index of the first slot of the specified PRACH or Msg1 occasion (0≤t_id<80), f_id is the index of the specified PRACH within the slot in the frequency domain, and ul_carrier_id is the UL carrier used for Msg1 transmission (0 for NUL and 1 for SUL).

If the UE selects the MsgA resource from the resource pool or the RACH configuration for the new 2 step RA procedure, i.e. for MsgB, UE monitors PDCCH addressed to RA-RNTI=1+s_id+14*t_id+14*80*f_id+14*80*8*ul_carrier_id, where:

s_id is the index of the first OFDM symbol of the specified PRACH or Msg1 occasion (0≤s_id<14), t_id is the index of the first slot of the specified PRACH or Msg1 occasion (0≤t_id<80), f_id is the index of the specified PRACH within the slot in the frequency domain, and ul_carrier_id is the UL carrier used for MsgA transmission (2 for NUL and 3 for SUL).

It is to be noted that in the RA-RNTI calculation, additional parameter(s) to indicate a frame index or a BWP index may also be included.

Figure 17:
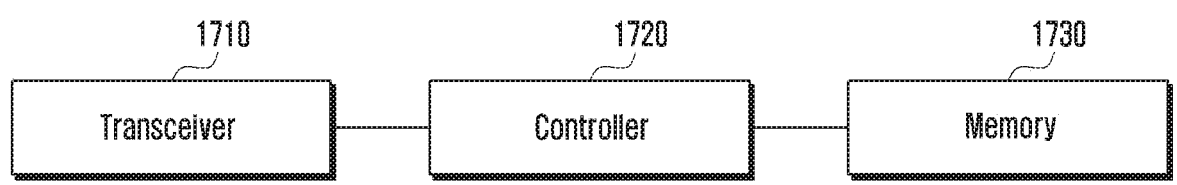
FIG. 17 is a block diagram of a terminal according to an embodiment of the disclosure.

FIG. 17 is a block diagram of a terminal according to an embodiment of the disclosure.

Referring to FIG. 17, a terminal includes a transceiver 1710, a controller 1720 and a memory 1730. The controller 1720 may refer to a circuitry, an ASIC, or at least one processor. The transceiver 1710, the controller 1720 and the memory 1730 are configured to perform the operations of the UE illustrated in the figures, e.g. FIGS. 1 to 16B, or as otherwise described above. Although the transceiver 1710, the controller 1720 and the memory 1730 are shown as separate entities, they may be realized as a single entity like a single chip. The transceiver 1710, the controller 1720 and the memory 1730 may also be electrically connected to or coupled with each other.

The transceiver 1710 may transmit and receive signals to and from other network entities, e.g., a base station.

The controller 1720 may control the UE to perform functions according to one of the embodiments described above. For example, the controller 1720 is configured to measure DL RSRP of a cell (on which the terminal will transmit Msg1). The controller 1720 may be configured to identify the DL RSRP of the cell based on SSB measurements or CSI-RS measurements of the serving cell. The controller 1720 may be configured to perform the measurement of the DL RSRP of the cell at initiation of the RA procedure or before each RA attempt of the RA procedure. The controller 1720 is configured to determine whether the DL RSRP of the cell is greater than a threshold. The controller 1720 is configured to perform the 2 step RA procedure on the cell if the DL RSRP of the cell is greater than the threshold, or the 4 step RA procedure on the cell if the DL RSRP of the cell is less than or equal to the threshold. The controller 1720 may be configured to perform the 2 step RA procedure by controlling the transceiver 1710 to transmit MsgA including a RA preamble and a MAC PDU to a base station controlling the cell, and controlling the transceiver 1710 to receive MsgB corresponding to the MsgA from the base station. The controller 1720 may be configured to control the transceiver 1710 to receive information on the threshold from the base station. The controller 1720 may be configured to determine whether the cell supports the 2 step RA procedure. The 2 step RA procedure can be performed only if the cell supports the 2 step RA procedure. The controller 1720 may be configured to control the transceiver 1710 to receive one or more resource pools for the 2 step RA procedure from the base station, and select an occasion for transmitting MsgA in the 2 step RA procedure from the one or more resource pools. The controller 1720 may be configured to determine whether a size of MsgA to be transmitted in the 2 step RA procedure is greater than a size of MsgA which can be transmitted in the 2 step RA procedure. The 2 step RA procedure can be performed if the size of MsgA to be transmitted in the 2 step RA procedure is less than or equal to the size of MsgA which can be transmitted in 2 step RA procedure.

In an embodiment, the operations of the terminal may be implemented using the memory 1730 storing corresponding program codes. Specifically, the terminal may be equipped with the memory 1730 to store program codes implementing desired operations. To perform the desired operations, the controller 1720 may read and execute the program codes stored in the memory 1730 by using a processor or a central processing unit (CPU).

Figure 18:
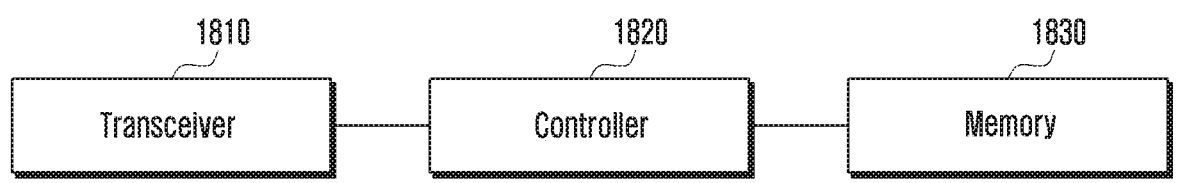
FIG. 18 is a block diagram of a base station according to an embodiment of the disclosure.

FIG. 18 is a block diagram of a base station according to an embodiment of the disclosure.

Referring to FIG. 18, a base station includes a transceiver 1810, a controller 1820 and a memory 1830. The controller 1820 may refer to a circuitry, an ASIC, or at least one processor. The transceiver 1810, the controller 1820 and the memory 1830 are configured to perform the operations of the network (e.g., the gNB) described above. Although the transceiver 1810, the controller 1820 and the memory 1830 are shown as separate entities, they may be realized as a single entity like a single chip. The transceiver 1810, the controller 1820 and the memory 1830 may also be electrically connected to or coupled with each other.

The transceiver 1810 may transmit and receive signals to and from other network entities, e.g., a terminal. The controller 1820 may control the base station to perform functions according to one of the embodiments described above. For example, the controller 1820 may be configured to control the transceiver 1810 to receive a MsgA including a RA preamble and the MAC PDU from a terminal, and transmit a MsgB corresponding to MsgA to the terminal. The controller 1820 may be configured to control the transceiver 1810 to transmit information on a threshold for determining whether to perform the 2 step RA procedure or the 4 step RA procedure to the terminal. The controller 1820 may be configured to control the transceiver 1810 to transmit one or more resource pools for the 2 step RA procedure to the terminal. The controller 1820 may be configured to control the transceiver 1810 to transmit information on maximum number (nrofSS-ResourcesToAverage) of beams (or SSBs) and a threshold (absThreshSS-Consolidation). In an embodiment, the operations of the base station may be implemented using the memory 1830 storing corresponding program codes. Specifically, the base station may be equipped with the memory 1830 to store program codes implementing desired operations. To perform the desired operations, the controller 1820 may read and execute the program codes stored in the memory 1830 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal configured with at least one serving cell for a random access (RA) procedure, the method comprising: measuring a downlink reference signal received power (DL RSRP) of a serving cell on which the RA procedure is initiated; identifying whether the DL RSRP of the serving cell is greater than a threshold for determining which type of the RA procedure the terminal performs; transmitting, to the serving cell, a first message for performing a two-step RA procedure in case that the terminal identifies that the DL RSRP of the serving cell is greater than the threshold, the first message including an RA preamble and a media access control (MAC) protocol data unit (PDU); identifying a radio network temporary identifier (RNTI) based on the two-step RA procedure being performed; and receiving, from the serving cell, a second message based on the RNTI, wherein the RNTI is identified as: RNTI=1+s_id+14×t_id+14×80×f_id+14×80×8×ul_carrier_id+14×80×8×2, where the s_id is an index of a first orthogonal frequency division multiplexing (OFDM) symbol of a physical RA channel (PRACH) occasion associated with transmission of the RA preamble, the t_id is an index of a first slot of the PRACH occasion in a system frame, the f_id is an index of the PRACH occasion in a frequency domain, and the ul_carrier_id is an uplink carrier used for the transmission of the RA preamble.

2. The method of claim 1, further comprising: performing a four-step RA procedure in case that the terminal identifies that the DL RSRP of the serving cell is less than or equal to the threshold.

3. The method of claim 1, further comprising:
receiving, from the serving cell, information on the threshold.

4. The method of claim 1, wherein the DL RSRP of the serving cell is identified based on synchronization signal block (SSB) measurements or channel state information reference signal (CSI-RS) measurements of the serving cell.

5. The method of claim 1, wherein the measurement of the DL RSRP of the serving cell is performed at initiation of the RA procedure.

6. The method of claim 1, wherein the measurement of the DL RSRP of the serving cell is performed before each RA attempt of the RA procedure.

7. The method of claim 1, further comprising: identifying whether the serving cell supports the two-step RA procedure; and performing the two-step RA procedure on the serving cell based on the serving cell supporting the two-step RA procedure.

8. The method of claim 1, further comprising: receiving, from the serving cell, one or more resource pools for the two-step RA procedure; and selecting a physical RA channel (PRACH) occasion for transmission of the RA preamble in the two-step RA procedure based on the one or more resource pools.

9. The method of claim 1, further comprising: identifying whether a size of a first message to be transmitted in the two-step RA procedure is greater than a size of a message which can be transmitted in the two-step RA procedure; and performing the two-step RA procedure on the serving cell based on the size of the first message to be transmitted in the two-step RA procedure being less than or equal to the size of the first message which can be transmitted in the two-step RA procedure.

10. A terminal configured with at least one serving cell in a wireless communication system, the terminal comprising: a transceiver; and a processor coupled with the transceiver and configured to: measure downlink reference signal received power (DL RSRP) of a serving cell on which a random access (RA) procedure is initiated, identify whether the DL RSRP of the serving cell is greater than a threshold for determining which type of the RA procedure the terminal performs, transmit, to the serving cell via the transceiver, a first message for performing a two-step RA procedure in case that the terminal identifies that the DL RSRP of the serving cell is greater than the threshold, the first message including an RA preamble and a media access control (MAC) protocol data unit (PDU), identify a radio network temporary identifier (RNTI) based on the two-step RA procedure being performed, and receive, from the serving cell via the transceiver, a second message based on the RNTI, wherein the RNTI is identified as:RNTI=1+s_id+14× t_id+14×80×f_id+14×80×8×ul_carrier_id+14×80×8×2, where the s_id is an index of a first orthogonal frequency division multiplexing (OFDM) symbol of a physical RA channel (PRACH) occasion associated with transmission of the RA preamble, the t_id is an index of a first slot of the PRACH occasion in a system frame, the f_id is an index of the PRACH occasion in a frequency domain, and the ul_carrier_id is an uplink carrier used for the transmission of the RA preamble.

11. The terminal of claim 10, wherein the processor is further configured to perform a four-step RA procedure in case that the terminal identifies that the DL RSRP of the serving cell is less than or equal to the threshold.

12. The terminal of claim 10, wherein the processor is further configured to control the transceiver to receive information on the threshold from the serving cell.

13. The terminal of claim 10, wherein the processor is further configured to identify the DL RSRP of the serving cell based on synchronization signal block (SSB) measurements or channel state information reference signal (CSI-RS) measurements of the serving cell.

14. The terminal of claim 10, wherein the processor is configured to perform the measurement of the DL RSRP of the serving cell at initiation of the RA procedure.

15. The terminal of claim 10, wherein the processor is configured to perform the measurement of the DL RSRP of the serving cell before each RA attempt of the RA procedure.

16. The terminal of claim 10, wherein the processor is further configured to:
identify whether the serving cell supports the two-step RA procedure, and perform the two-step RA procedure on the serving cell based on the serving cell supporting the two-step RA procedure.

17. The terminal of claim 10, wherein the processor is further configured to:
control the transceiver to receive one or more resource pools for the two-step RA procedure from the serving cell, and select a physical RA channel (PRACH) occasion for transmission of the RA preamble in the two-step RA procedure based on the one or more resource pools.

18. The terminal of claim 10, wherein the processor is further configured to:
identify whether a size of a first message to be transmitted in the two-step RA procedure is greater than a size of a message which can be transmitted in the two-step RA procedure, and perform the two-step RA procedure on the serving cell based on the size of the first message to be transmitted in the two-step RA procedure being less than or equal to the size of the message which can be transmitted in the two-step RA procedure.

* * * * *